United States Patent [19]

Yamaguchi et al.

[11] Patent Number: 5,018,081
[45] Date of Patent: May 21, 1991

[54] PRINTER WITH AUTOMATIC RESTART

[75] Inventors: Ikunori Yamaguchi; Yoshikazu Ikenoue, both of Osaka, Japan

[73] Assignee: Minolta Camera Kabushiki Kaisha, Osaka, Japan

[21] Appl. No.: 506,566

[22] Filed: Apr. 5, 1990

Related U.S. Application Data

[63] Continuation of Ser. No. 294,783, Jan. 9, 1989, abandoned.

[30] Foreign Application Priority Data

Jan. 7, 1988 [JP] Japan .................................. 63-1697
Jan. 7, 1988 [JP] Japan .................................. 63-1698

[51] Int. Cl.⁵ .............................................. G03G 12/00
[52] U.S. Cl. ...................................... 364/519; 400/76
[58] Field of Search .......................... 364/518–521; 358/452; 400/68, 76, 83, 171, 175, 183, 225; 340/734, 750; 346/150, 160.1, 33 R

[56] References Cited

U.S. PATENT DOCUMENTS

| | | | |
|---|---|---|---|
| 4,031,519 | 6/1977 | Findley | 364/900 |
| 4,310,840 | 1/1982 | Williams et al. | 340/724 |
| 4,345,276 | 8/1982 | Colomb | 358/450 X |
| 4,520,455 | 5/1985 | Crean et al. | 364/900 |
| 4,541,061 | 9/1985 | Schoon | 364/518 |
| 4,616,327 | 10/1986 | Rosewarne et al. | 364/518 |
| 4,648,047 | 3/1987 | Berkland et al. | 364/519 |
| 4,661,812 | 4/1987 | Ikeda | 340/799 |
| 4,675,833 | 6/1987 | Cheek et al. | 364/523 |
| 4,694,405 | 9/1987 | Bradbury et al. | 364/518 |
| 4,698,755 | 10/1987 | Okazaki et al. | 364/519 |
| 4,703,438 | 10/1987 | Nishiyama et al. | 364/519 |
| 4,737,923 | 4/1988 | Matsuzaki et al. | 364/519 |
| 4,745,576 | 5/1988 | Hasegawa et al. | 364/900 |
| 4,760,608 | 7/1988 | Suzuki | 358/452 X |
| 4,769,648 | 9/1988 | Kishino et al. | 346/33 |
| 4,778,288 | 10/1988 | Nakamura | 400/61 X |
| 4,796,203 | 1/1989 | Roberts | 364/521 |
| 4,805,135 | 2/1989 | Ochi et al. | 364/900 |
| 4,811,242 | 3/1989 | Adachi | 364/519 |

Primary Examiner—Gary V. Harkcom
Assistant Examiner—H. R. Herndon
Attorney, Agent, or Firm—Burns, Doane, Swecker & Mathis

[57] ABSTRACT

A printer for printing bit images in accordance with printing information and control information which includes a detector for detecting when a print engine enters a predetermined state such as an abnormal state. A memory stores data relating to at least one page of bit images being printed at the time the predetermined state is entered. When the printing engine recovers from the predetermined state, the data stored in the memory are read out to immediately restart the printing operation.

10 Claims, 38 Drawing Sheets

MCB buffer

MCB

R_buffer

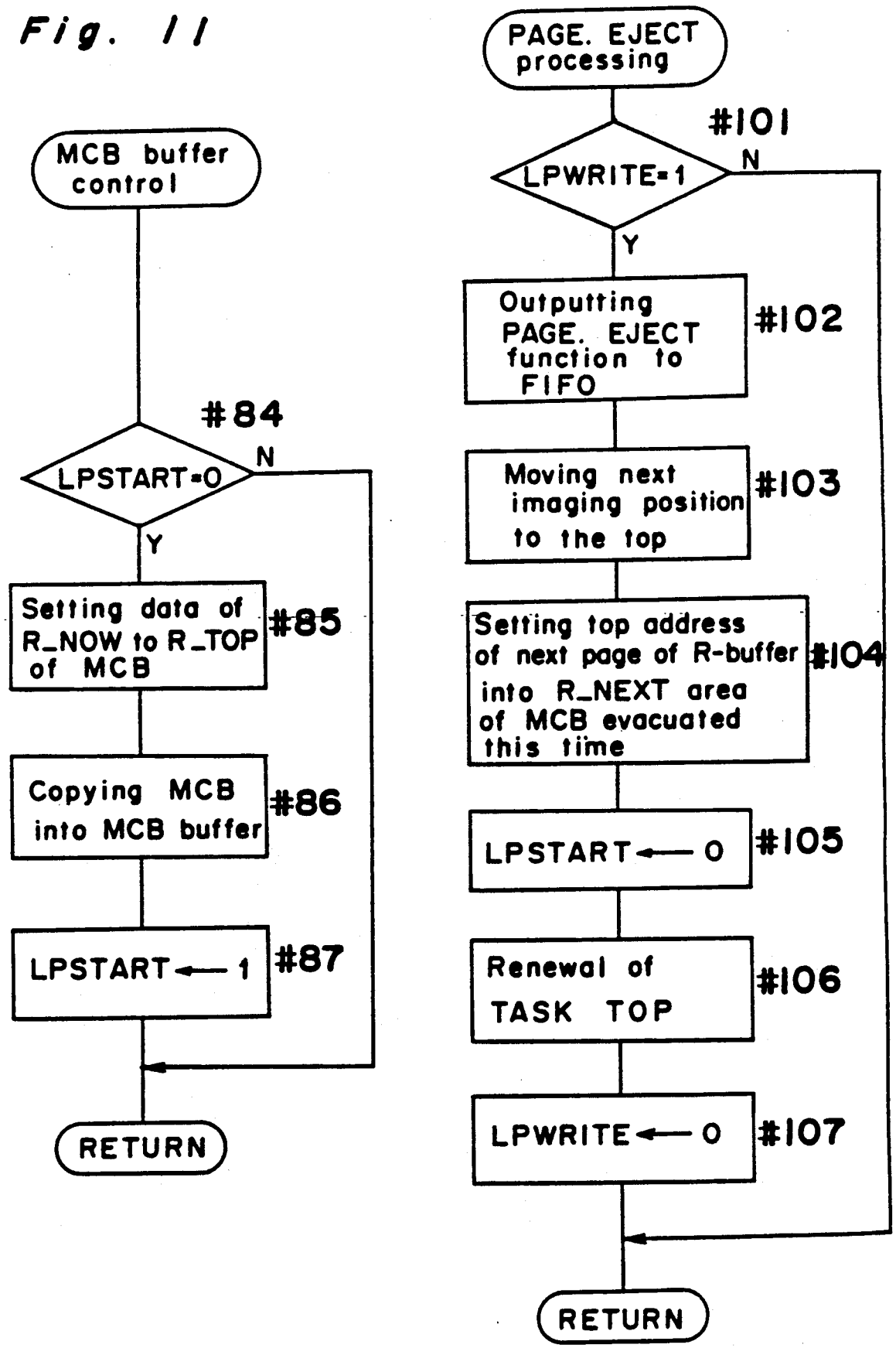

Fig. 27
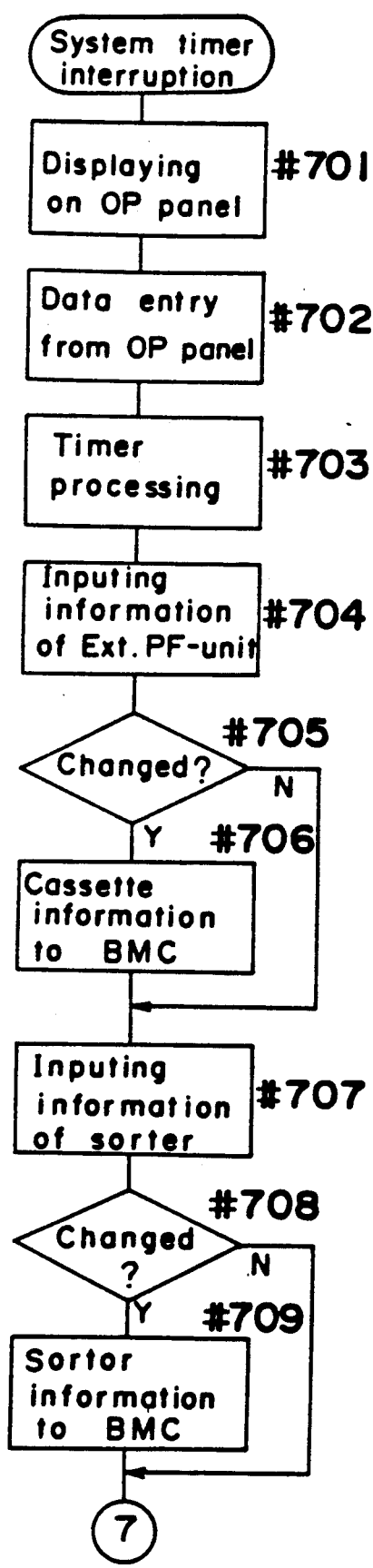
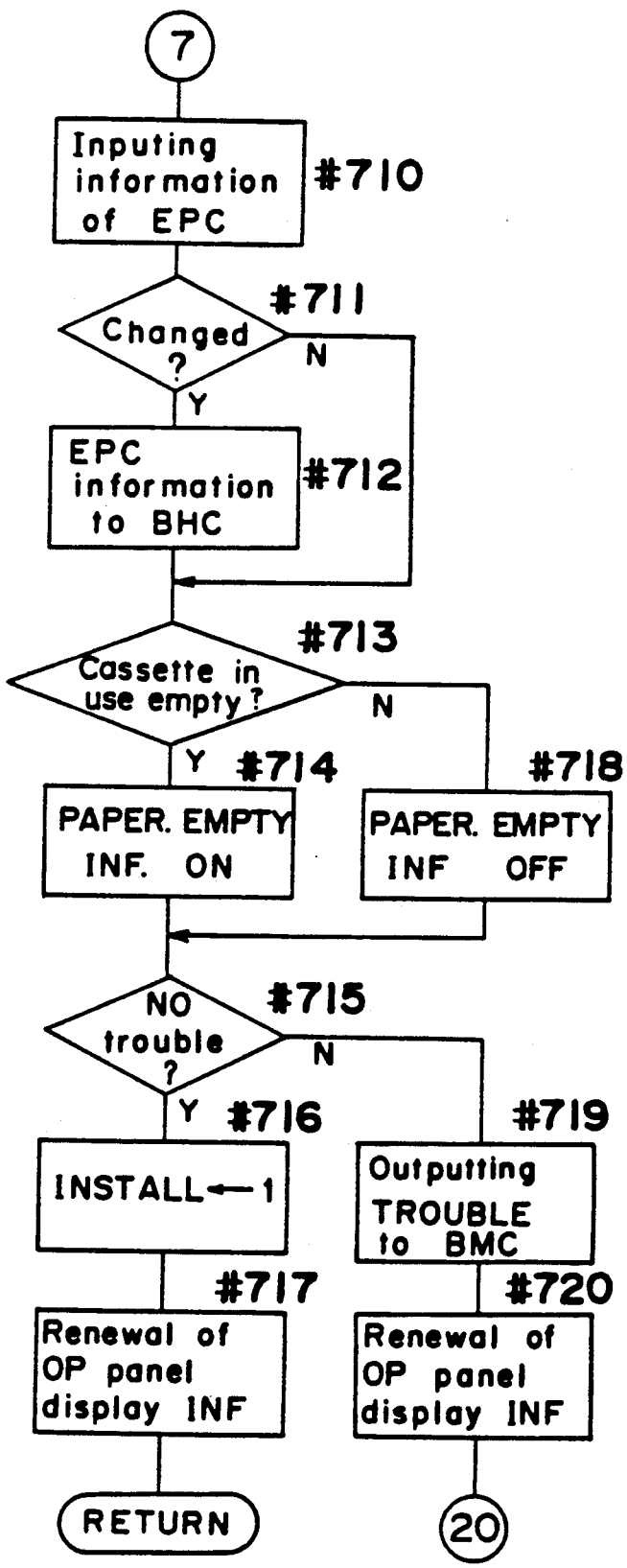

JOB MEMORY a: MCB stack area (constant volume)

b: JOB memory area a′,b′: current page area

Composition of MCB

Fig. 31(b)-I
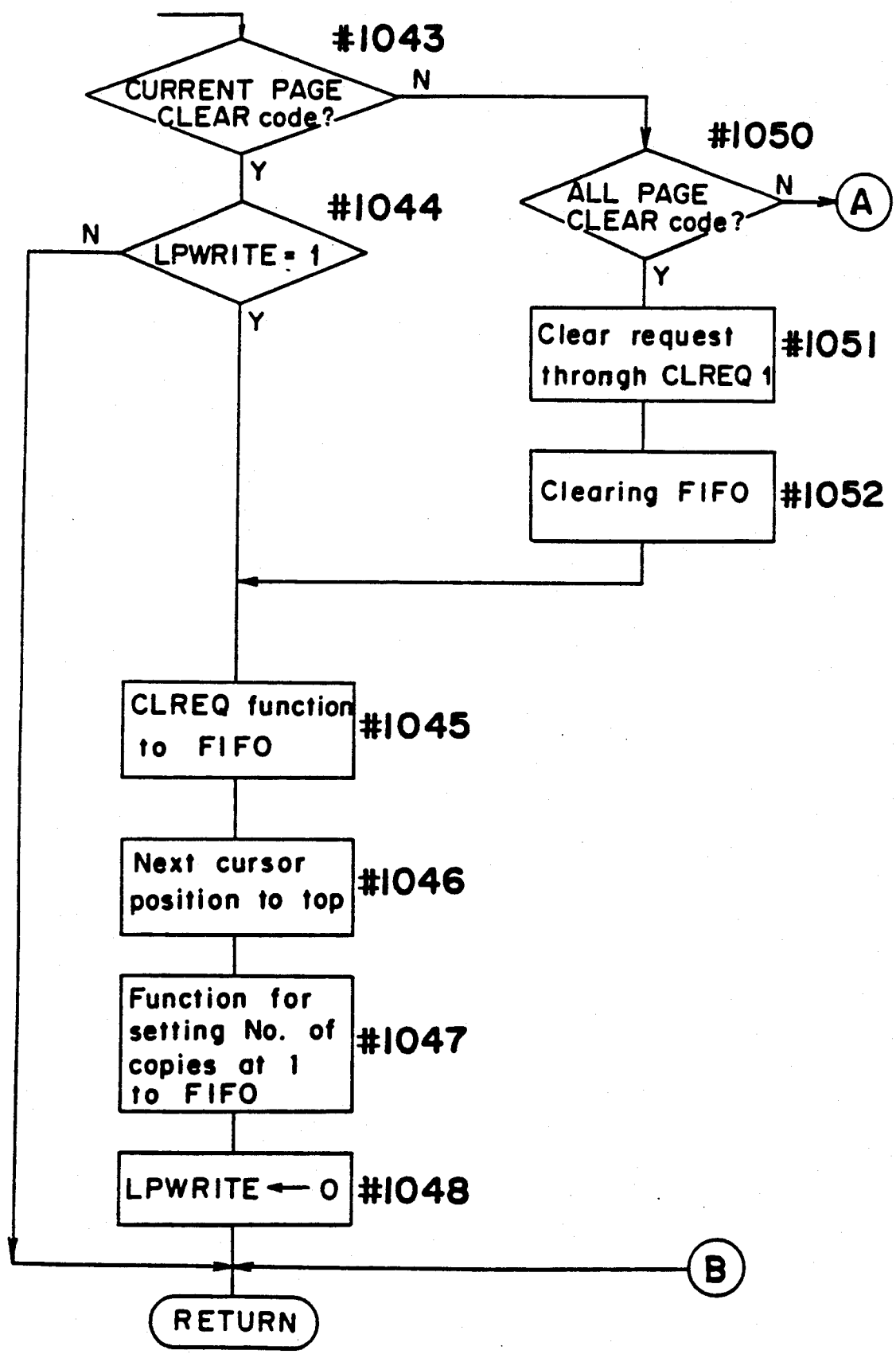

Fig. 31(b)-II
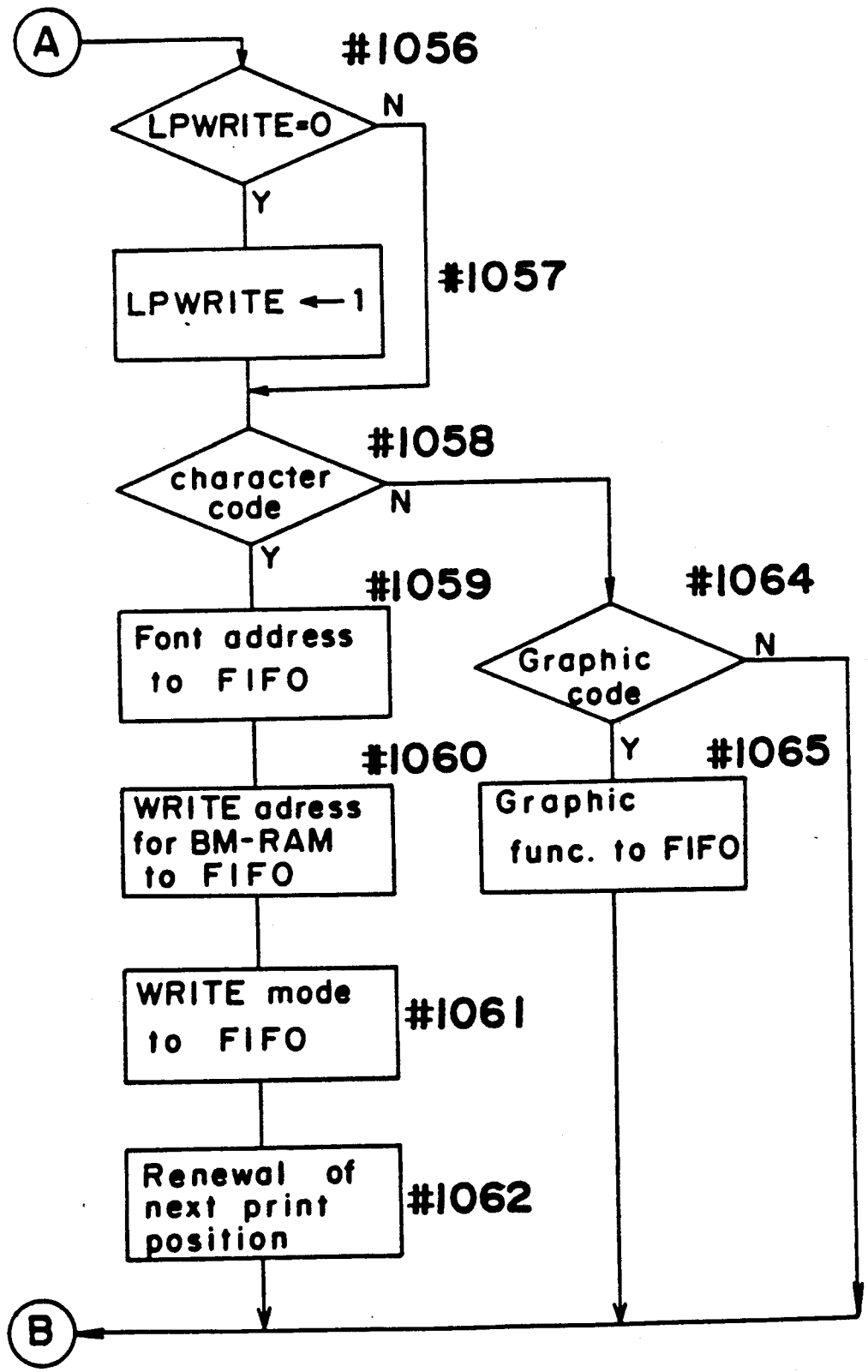

PRINTER WITH AUTOMATIC RESTART

This application is a continuation of application Ser. No. 294,783, filed Jan. 9, 1989, now abandoned.

BACKGROUND OF THE INVENTION

1. Field of the Invention

The present invention relates to a printer for printing bit images according to data input from a data processor such as a host computer.

2. Description of the Prior Art

As is well known, data sent from a data processor to a printer are comprised of image code data for bit map images to be printed out and control data for controlling the print method and mode of a print engine of the printer. A controller of the printer processes image code data to be transformed into bit map images to be printed out and sends bit images to the print engine. In a conventional printer utilizing the electro-photographic process, the printing operation thereof is stopped when a trouble such as a paper jam is caused. Upon restarting the printer after removing the cause of the trouble, it is needed to switch on the power source for the printer or to operate a reset button therefor. Thus, once a trouble is caused, data having been stored in the printer are automatically erased. Therefore, the data have to be input again from the external data processor into the printer.

This invites a considerable time loss to restart the printer since it becomes necessary to wait completion of data transmission from the external data processor to the printer.

SUMMARY OF THE INVENTION

One object of the present invention is to provide a printer being capable of restarting the printing operation thereof without data transmission from an external data processor after recovery from a trouble state.

Another object of the present invention is to provide a printer having at least one memory means for storing data regarding at least one page in printing from which the stored data can be read out in order to restart the printing operation after recovery from a trouble.

In order to achieve these objects, according to the present invention, there is provided a printer comprising: a receipt means for receiving code data indicating printing information and control information sent from an external apparatus; an analysis means for analyzing received code data; a first memory means for storing resultant data obtained by the analysis means; an output means for outputting print data to a printing section of the printer in accordance with said resultant data memorized in said first memory means; a signal generation means for generating a signal indicating a predetermined state when the printing section falls thereinto; a second memory means for memorizing format information regarding at least one page including the page being in printing; a control means for stopping operation of said printing section when said signal is generated by said signal generation means and restarting said printing operation of the printing section in accordance with the format information memorized in said second memory means when said predetermined state is dissolved.

When the printer falls into a predetermined state such as a trouble state, the signal generation means generates a signal indicating the predetermined state. Due to this signal, the control means stops the printing operation of the printer and, when the predetermined state is dissolved, restarts the printing operation according to data memorized in respective memory means.

According to another aspect of the present invention, there is provided a printer comprising: a receipt means for receiving code data indicating printing information and control information sent from an external apparatus; a first memory means for memorizing received code data; an analysis means for analyzing said code data memorizing in said first memory means; a second memory means for memorizing resultant data obtained by said analysis means; an output means of outputting printing data to a printing section of the printer in accordance with said resultant data memorized in said second memory means; a signal generation means for generating a signal indicating a predetermined state when the printing section falls thereinto; a third memory means for memorizing format information regarding at least the page in printing said third memory means being connected to said analysis means; and a control means for stopping printing operation of said printing section when said signal is generated by said signal generation means and restarting said printing operation of the printing section in accordance with the format information memorized in said third memory means when said predetermined state is dissolved.

In the printer resultant data obtained by the analysis means are stored in the second memory means and, when the printer is recovered from the predetermined state, they are read out from the second memory means to form bit images according to the format information memorized in the third memory means. Therefore, the printer can restart the printing operation regarding the page suspended temporarily.

According to a further aspect of the present invention, there is provided a printer comprising: a receipt means for receiving code data indicating printing information and control information sent from an external apparatus; a first memory means for memorizing received code data; an analysis means for analyzing said code data memorized in said first memory means; a second memory means for memorizing resultant data obtained by said analysis means; an output means for outputting printing data to a printing section of the printer in accordance with said resultant data memorized in said second memory means; a signal generation means for generating a signal indicating a predetermined state when said printing section falls thereinto; a third memory means for memorizing format information regarding at least a page in printing, said third memory means format information analyzed by said analysis means; and a control means for stopping the printing operation of said printing section when said signal is generated an restarting the printing operation of said printing section in accordance with the format information memorized in said third memory means when said predetermined state is dissolved.

In the printer the third memory means memorizes format information having been analyzed by the analysis means and, accordingly, resultant data stored in the second memory means can be directly transformed into bit images according to the analyzed format information.

BRIEF DESCRIPTION OF DRAWINGS

These and other objects and features of the present invention will become more apparent when the preferred embodiment of the present invention is described in detail with reference of accompanied drawings in that;

FIG. 11 is a flow chart of MCB buffer control routine;

FIG. 13 is a flow chart of PAGE EJECT processing;

FIG. 27 is a flow chart of SYSTEM TIMER interruption;

DETAILED DESCRIPTION OF THE PREFERRED EMBODIMENT

First Preferred Embodiment (a) Composition of Electro-photographic Printer

Figure 1:
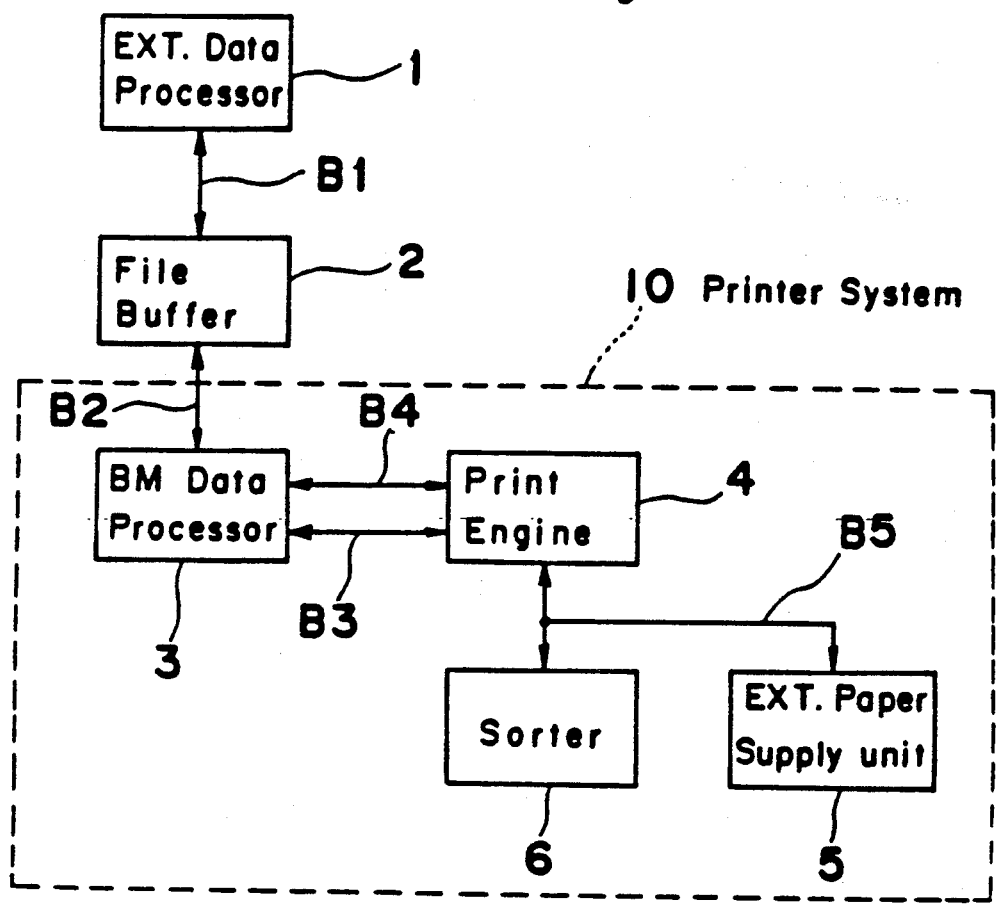
FIG. 1 is a block diagram of an electro-photographic printer system to which the present invention is applied.

FIG. 1 shows an image forming system including a printer system 10 according to the present invention.

Data from an external data processor 1 such as a host computer are once stored into an external file buffer 2 in order to improve throughput of the external data processor 1 and, thereafter, are outputted from the file buffer 2 to the printer system 10.

The printer system 10 is comprised of a data processor 3 for controlling a bit map memory (See FIG. 4), a print engine 4 including a laser means and an electro-photographic print means and accessory apparatuses such as an external paper supply unit 5, a sorter 6 and the like.

Figure 2:
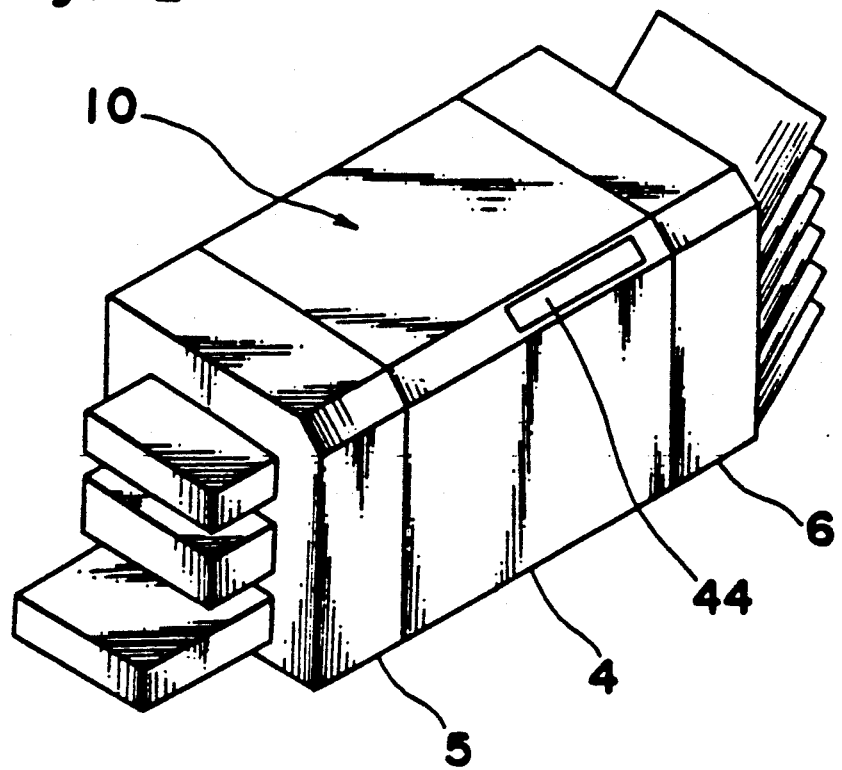
FIG. 2 is a perspective view of the printer system according to the present invention.

FIG. 2 is a perspective view of the printer system 10.

The print engine 4 installs the bit map data processor 3 therein and the external paper supply unit 5 and the sorter 6 are assembled to the print engine 4. On a front edge portion of the upper surface of the body of the print engine 4, there is provided an operation panel 44 having display means for displaying various indications regarding the printer system and a key means for inputting data and/or commands.

Figure 3:
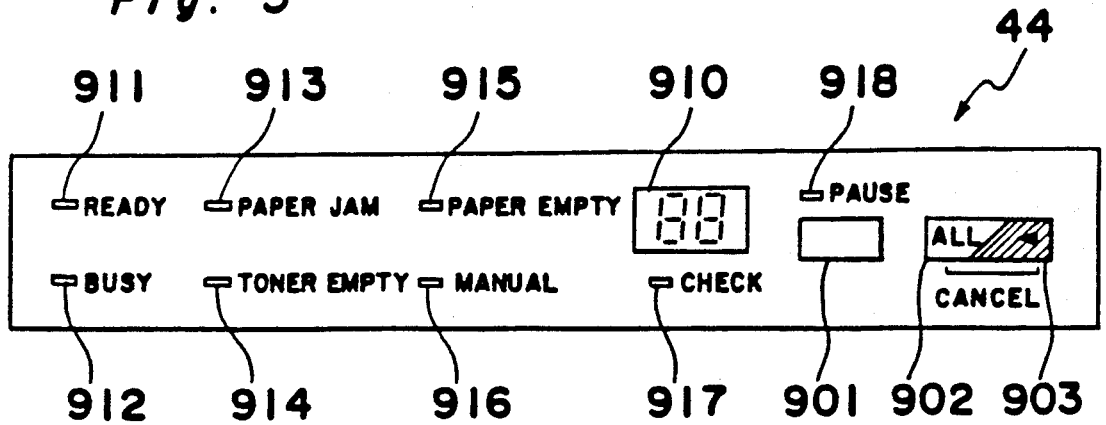
FIG. 3 is a plan view of an operation panel of the printer.

FIG. 3 shows a plan view of the operation panel 44. On the operation panel 44, entry keys 901 to 903 and indicators 910 to 918 are arranged. The key 901 is a PAUSE key for stopping a printing operation temporarily. The key 902 is a TEST key for performing a test printing operation. The key 903 is a SHIFT key and becomes a CANCEL key for stopping a printing operation when it is pushed down together with the TEST key 902. The reason why CANCEL function becomes effective only when both of keys 902 and 903 are pushed down at the same time is to avoid an undesirable cancel by a careless operation.

Figure 4:
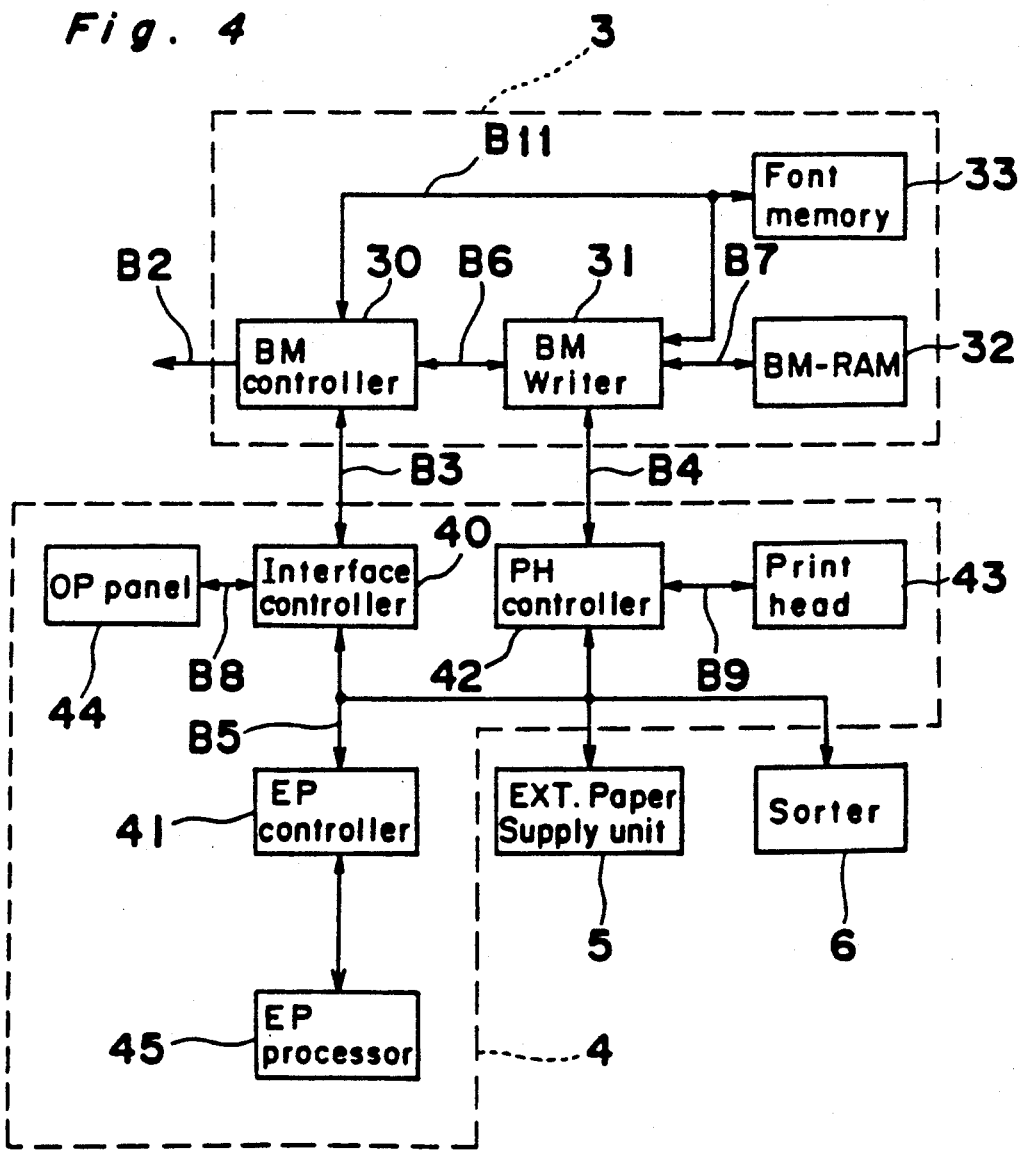
FIG. 4 is a block diagram showing structures of a bit map type data processor and a print engine of the printer system according to the present invention.

FIG. 4 is a block diagram of the printer system 10.

The bit map data processor 3 is comprised of a bit map controller (BMC) 30, a bit map random access memory (BM-RAM) 32, a bit map writer (BMW) 31 for imaging bit images on BM-RAM 32 and a font memory means 33. Communication between the bit map data processor 3 and the print engine 4 is done through a bus means B3 for control data such as a number of prints, accessory control signal and the like and a bus means B4 for image data.

The print engine 4 is essentially comprised of an interface controller 40, an electro-photographic process controller 41 and a print head controller 42. The interface controller (IFC) 40 performs processing of control data from the bit map controller 30, control of the operation panel 44 and timing control of the print engine 4 through an internal bus B5. The electro-photographic process controller 41 controls an electro-photographic processor 45 according to data sent from the interface controller 40 through the internal bus B5. The print head controller (PHC) 42 controls a semiconductor laser ( not shown ) and a polygon mirror ( not shown ) provided in a print head 43 according to information sent from IFC 40 through the internal bus B5 in order to write image data sent from BMW 31 through the internal bus B4. Also, the external paper supply unit 5 and the sorter 6 are controlled, through the internal bus B5, by IFC 40.

As is apparent from the above mentioned, the printer system 10 is a kind of laser printer of bit map type. Print data (being usually represented by codes) sent from the external data processor 1 are developed as dot images on BM-RAM 32 of the bit map data processor 3 and, then, outputted to the print engine 4. The print engine 4 writes dot images on a photoconductive drum by controlling the laser means according to data sent from the bit map data processor 3 and transfers written dot images on a blank paper according to the electro-photographic process as is well known to those skilled in the art.

Data sent from the external data processor 1 includes codes for control of the print format and codes for setting respective modes of the print engine 4 other than image data. The bit map data processor 3 analyzes protocols of these codes other than character codes and outputs commands for print format control, for supplying a blank paper to the print engine 4, for alteration of mode of the accessory and the like according to the result of the protocol analysis. The print engine 4 performs various controls such as control of the print head 43, timing control of a paper, controls in synchronous with a paper feeding toward the sorter 6. These controls are similar to those of an electro-photographic copy machine except for control of the scanning system needed for the latter.

(b) Bit Map Controller

Figure 5:
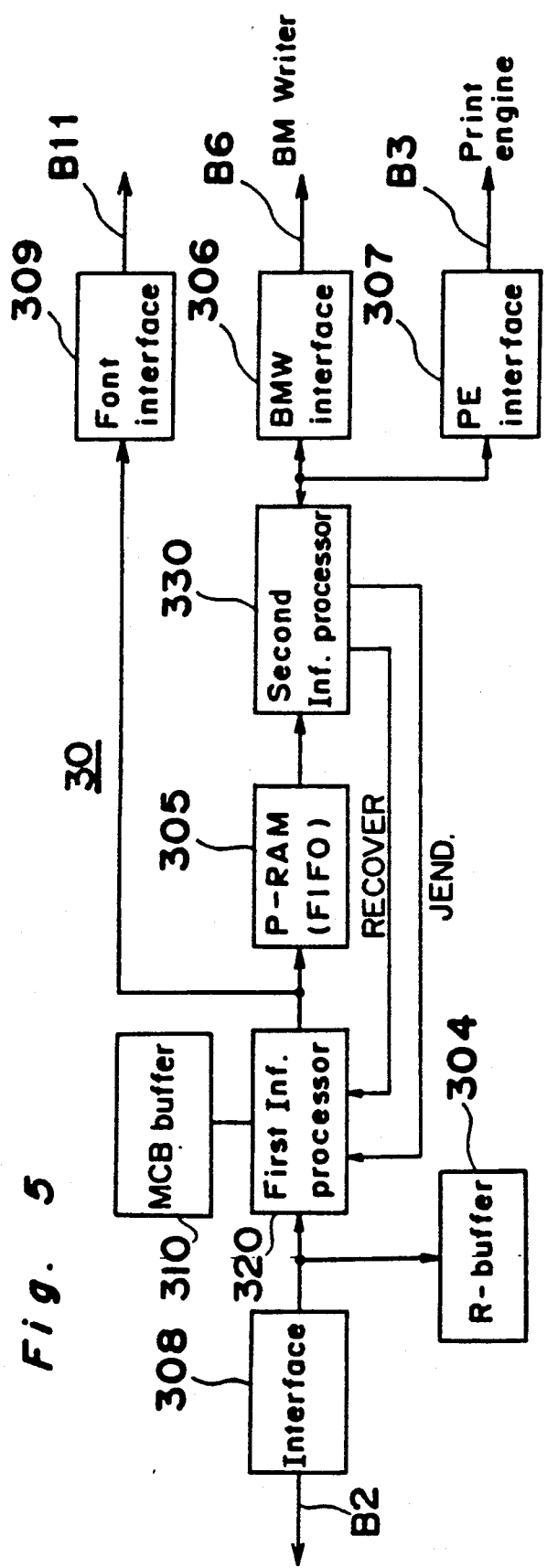
FIG. 5 is a block diagram of the bit map controller.

FIG. 5 shows a block diagram of the bit map controller 30 according to the present invention.

In order to write dot images by the bit map writer 31, it is necessary to calculate individual addresses in the font memory means and BM-RAM 32.

In the preferred embodiment of the present invention, there are provided a first information processor 320 for analyzing data and a second information processor 330 for print control and these two processors 320 and 330 are connected via a P-RAM 305 for memorizing intermediate codes as shown in FIG. 5.

The first information processor 320 executes PACKET processing for data stored temporarily in an R-buffer 304 in asynchronous with data entry. In this packet processing, protocol analysis, pre-edition of image data, transformation of them into intermediate codes as the result of the pre-edition which are intended to make imaging into BM-RAM 32 easier and storing intermediate codes into P-RAM 305 are performed successively. In the pre-edition of image data, respective print positions of individual image data are determined according to the result of the protocol analysis. Therefore, every intermediate code includes a pattern code of the image data and an address on BM-RAM 32 at which a dot image corresponding to the intermediate code is to be formed.

As P-RAM 305, there is used a first-in first-out memory (hereinafter referred to FIFO) in the present preferred embodiment. In FIFO 305, transformed intermediate codes are sequentially written into an empty area thereof while they are read out in the order according to which they have been memorized therein. Thus, writing and reading of intermediate codes are executed without aid of software. Accordingly, each information processor 320 or 330 can operate irrespective of the other information processor.

Figure 6A:
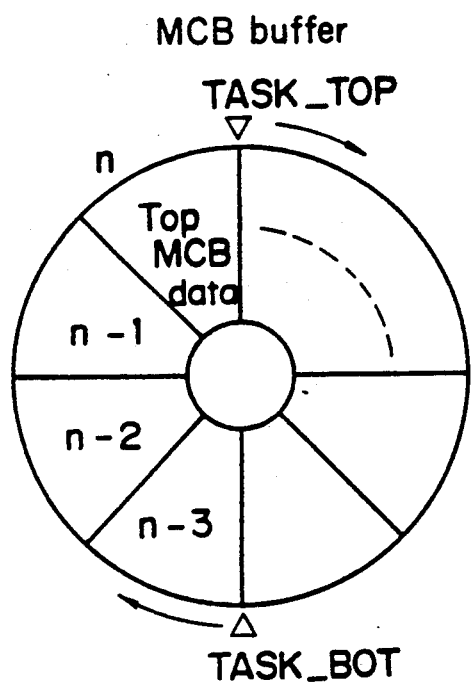
FIG. 6 shows compositions of MCB buffer (a), MCB (b) and R-buffer (c)
Figure 6B:
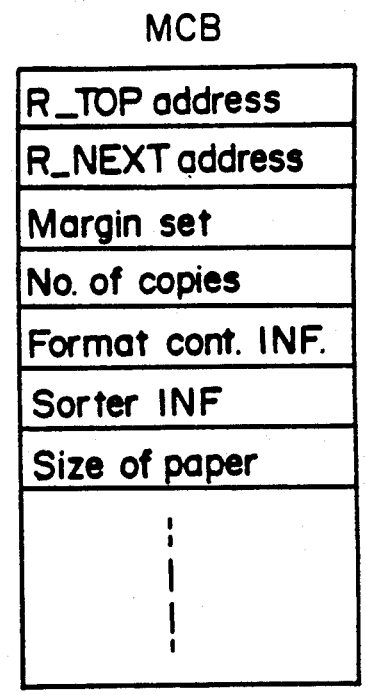
Figure 6C:
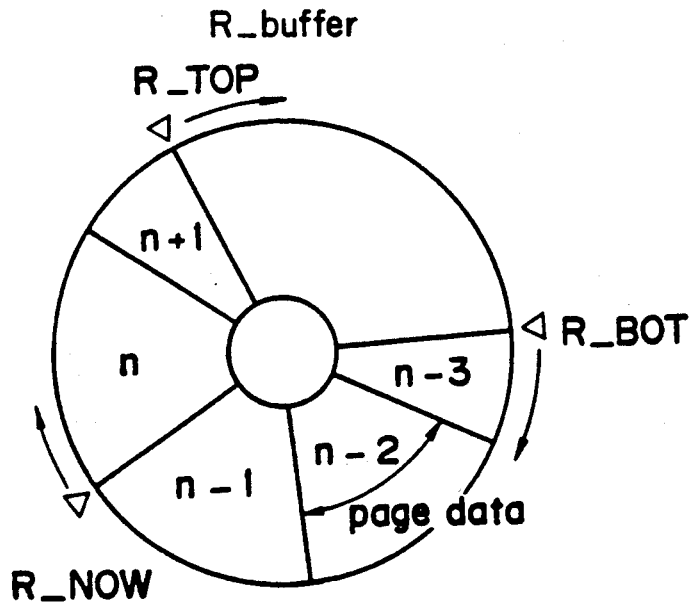

The R-buffer 304 for storing image data from the external data processor temporarily is comprised of a ring buffer in which the last address is followed by the top address as shown in FIG. 6(c). It is managed by three pointers comprised of an R_BOT pointer indicating an address wherein the oldest data is stored, an R-TOP pointer indicating an address wherein the most fresh data is stored and an R_NOW pointer indicating an address wherein the data in processing now is stored.

There is also provided an MCB ( Map Control Block ) memory 310 for managing data having been processed by the first information processor 320, as shown in FIG. 5. The MCB memory 310 memorizes data in unit of page which have been sent to FIFO 305, as shown in FIG. 6(a). The data in unit of page, namely, MCB has a predetermined length and memorizes data in the order of R_TOP address indicating the top address of MCB ( page data ) in R-buffer 304, R_NEXT address indicating the top address of the next page data in R-buffer 304, a parameter for setting a margin, a number of prints, format control information, sorter information, a parameter indicating the designated size of paper and so on, as shown in FIG. 6(b).

MCB memory is also comprised of a ring buffer similarly to R-buffer and is managed by TASK_BOT pointer indicating the top address of the oldest MCB having been written therein, TASK_TOP pointer indicating the top address of the most fresh MCB therein.

On the contrary to the above, the second information processor 330 reads stored intermediate codes from FIFO 305 to process them. It outputs control commands for the print engine 4 corresponding to intermediate codes to the print engine interface 307, outputs intermediate codes other than control commands for the print engine to the bit map writer interface 306 and performs imaging of dot images into BM-RAM 32 and printing operation.

Further, the second information processor 330 is connected to the first information processor 320 through signal lines of RECOVER and JEND in order to execute a recovery processing from a trouble in the print engine 4. It monitors the state of the print engine and sends signals through these signal lines if necessary.

Figure 7:
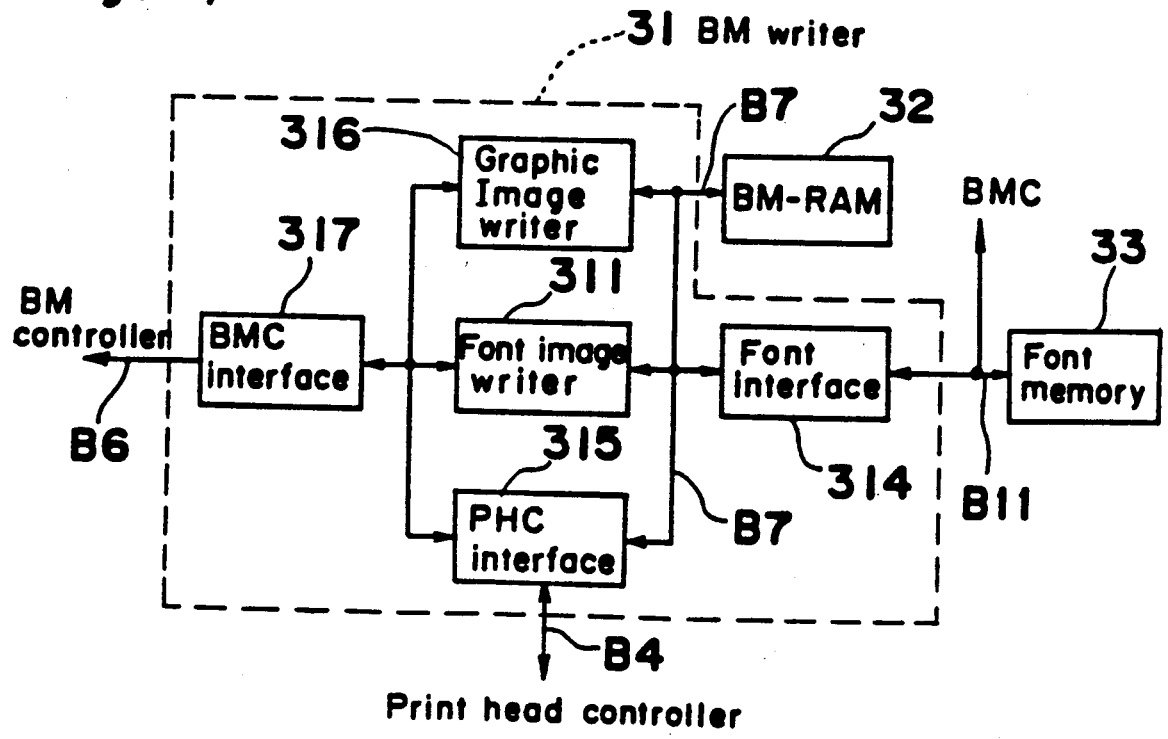
FIG. 7 is a block diagram of a bit map writer according to the present invention.

FIG. 7 shows a block diagram of the bit map writer 31.

Functions of the bit map writer 31 are generally classified into an imaging function onto BM-RAM 32 and an outputting function for outputting data in BM-RAM 32 to the print engine 4 upon printing.

The imaging function is further divided into an imaging function for imaging lines and/or circles which is executed by a graphic image writer (GIW) 316 and an imaging function for imaging characters which is executed by a font image writer (FIW) 311. Both of the graphic and font image writers 316 and 311 are operated according to packets sent from the bit map controller 30 through a bit map controller (BMC) interface 317. The graphic image writer 316 usually writes bit images on BM-RAM 32 according to results obtained by analyzing parameters included in a packet, while the font image writer 311 usually writes font images on BM-RAM 32 which are read from the font memory 33 through a font memory interface 324 according to data in FIFO 305.

On the contrary, the output function for outputting data upon printing is executed by a print head controller interface 315. Namely, when it receives a PRINT START code sent from the bit map controller 30 through the bit map controller interface 317, it outputs data in BM-RAM 32 to the print head controller 42 in synchronous with synchronized signals sent from a control circuit of the print head controller 42 through the bus B4.

Figure 8:
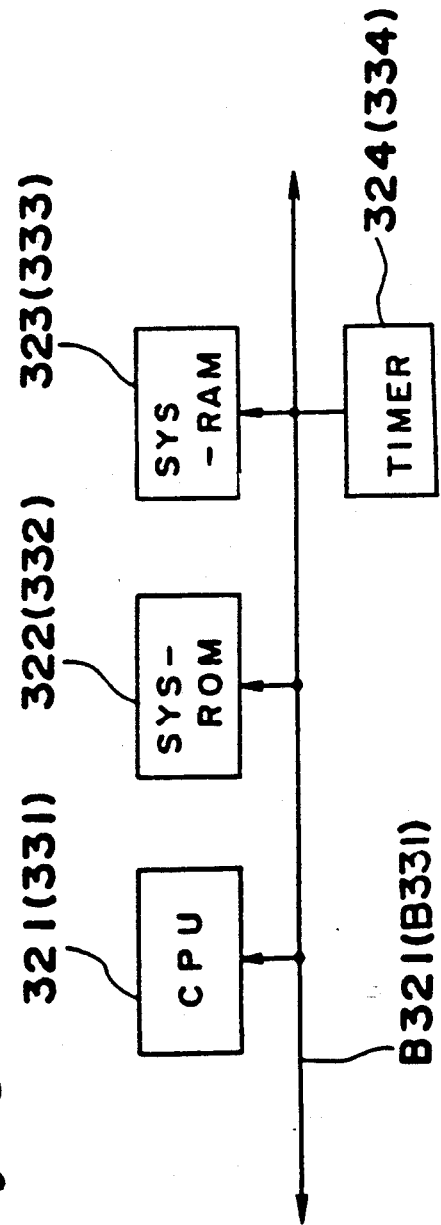
FIG. 8 is a system composition of first information processor (second information processor)

FIG. 8 shows an example of hard-ware structure for the first and the second information processors 320 and 330. Each of the information processors is comprised of a CPU 321 (331), a system ROM 322 (332) memorizing programs for CPU 321 (331), a system RAM 323 (333) to be used for a working memory area and a timer 324 (334) for enabling CPU 321 (331) to control timing.

Figure 9:
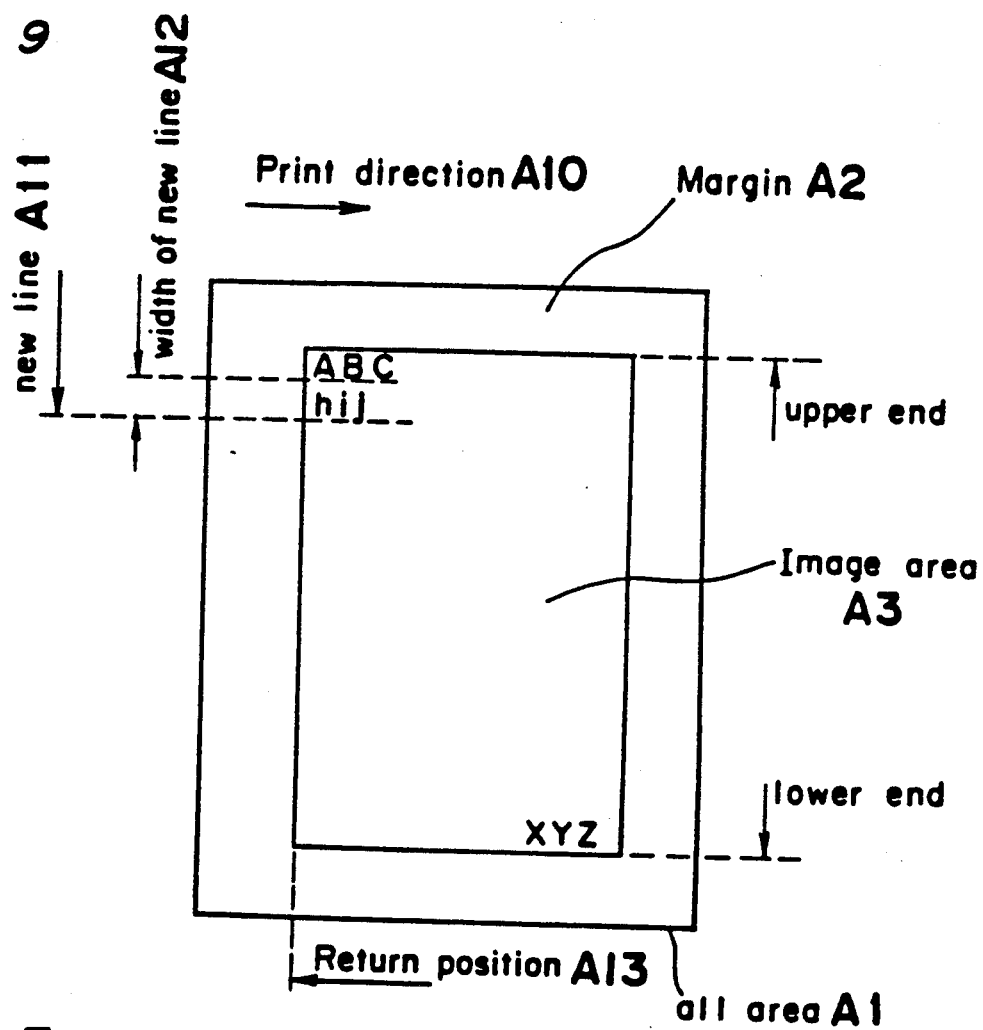
FIG. 9 is a plan view showing an image area of a print.

FIG. 9 shows an example of an image area.

Whole area A1 corresponding to a paper size is an area provided on BM-RAM 32. A margin area A2 is an area to be made remain blank upon printing and an image area A3 is an area in which dot images are to be printed.

The print is started from a left upper corner of the image area A2 and is proceeded in a printing direction A10. When a NEW LINE code is input, the next print position is moved by a line width A12 set for a new line in a new line direction A11. When a RETURN LINE code is input, the next print position is moved to a return line position A13 on the left edge of the image area A3.

(c) Bit Map Control

Hereinafter, operations of the printer system will be described according to flow charts shown in FIGS. 10 to 27.

In the printer system according to the present invention, two main routines are executed parallel by the first and second information processors 320 and 330, respectively.

<c-1> Routine by 1st information processor

FIGS. 12 to 17 are flow charts of routines to be executed by the first information processor 320 of the bit map controller 30.

Figure 10:
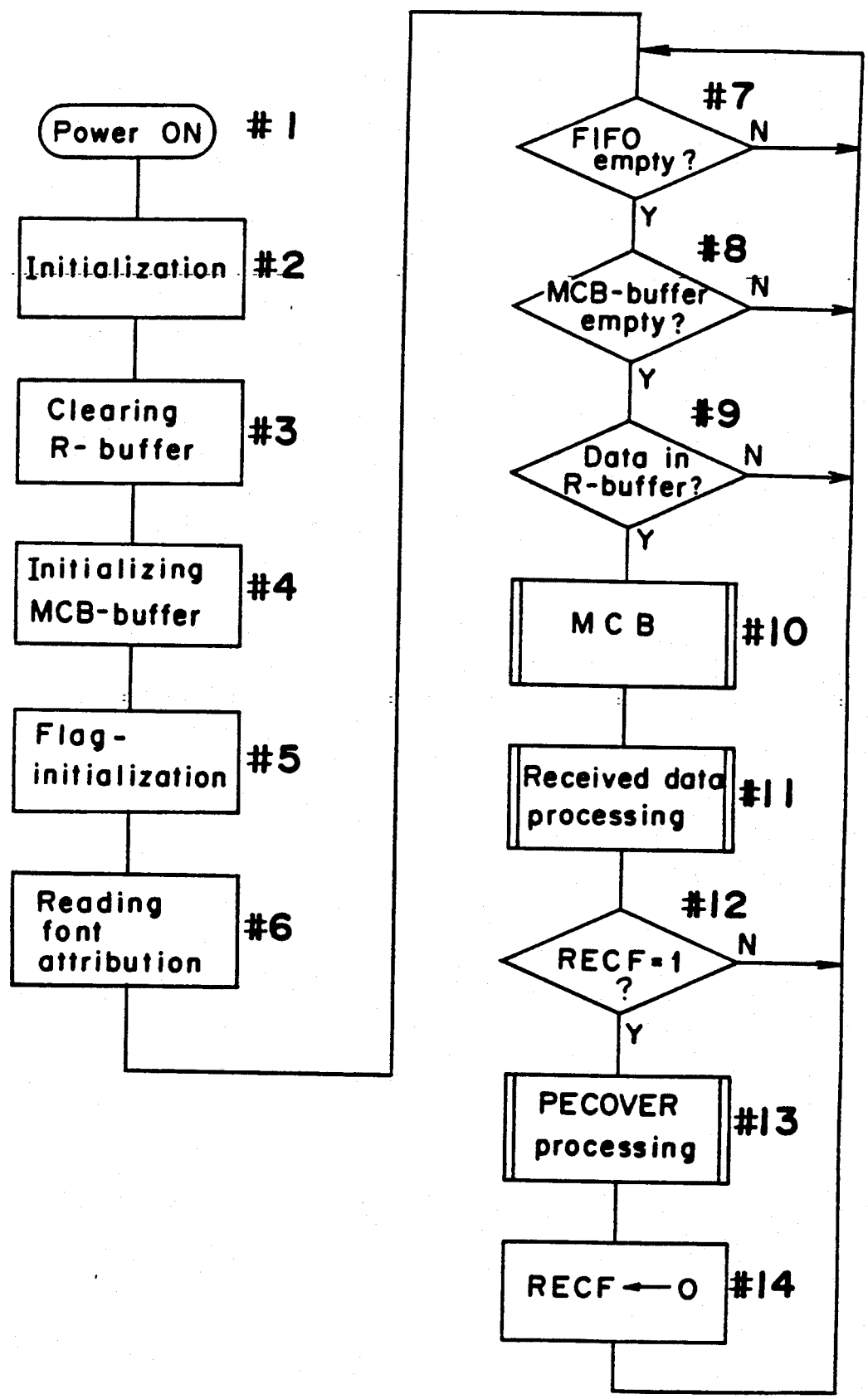
FIG. 10 is a flow chart of the main routine to be executed by the first information processor.

Referring to FIG. 10, when the power source is turned on at step #1, the first information processor 320 is initialized internally at step #2 and, then, R-buffer 304 for storing data received from the external data processor 1 is cleared at step #3. Also, address pointers of each MCB are reset at step #4 and, then control flags are initialized at step #5. Concretely, LPWRITE flag for indicating "preediting stage" in a received data processing routine, RECF flag indicating that RECOVER interruption is requested from the second information processor 330 and LPSTART flag indicating start of each page data are cleared, respectively. As stated above, FIFO 305 is forcibly cleared upon switching on the power supply. Then, at step #6, a font attribution is read from the font memory 33 in preparation for transformation into intermediate codes in order to determine a font format of characters to be printed.

After completion of these preparation operations, the process enters into a main loop including steps from #7 to #14. In this main loop, analysis of received data and transformation into intermediate codes are executed. At first, data sent from the external data processor 1 are stored in R-buffer 304 by an interruption routine (See FIG. 15) for receiving data which is started in asynchronous with the main loop by a REQUEST command from the data processor interface 308.

Figure 15:
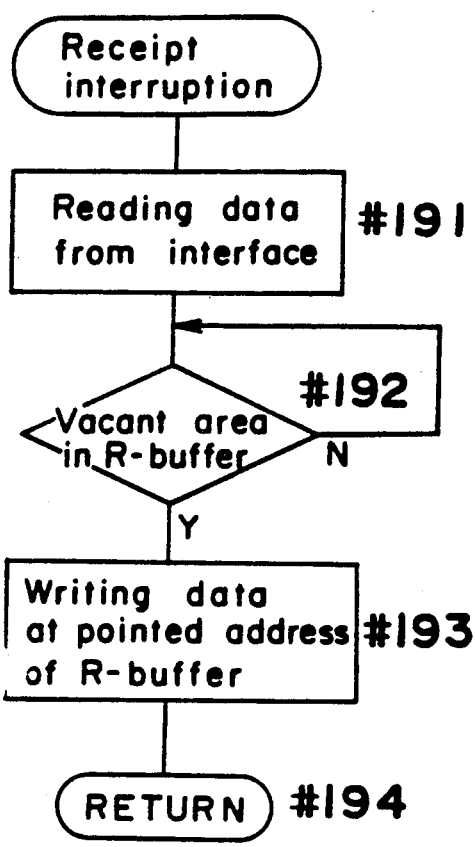
FIG. 15 is a flow chart of RECEIPT INTERRUPTION processing.

In the RECEIPT INTERRUPTION routine of FIG. 15, each of received data is reset is read out from the data processor interface 308 at step #191 and, if there is an empty area in R-buffer 304 (YES at step #192), the read data is written into at the address of R-buffer indicated by R_TOP pointer at step #193.

If FIFO 305 is not full at step #7, MCB buffer 310 is not full at step #8 and there are data in R-buffer 304 at step #9, an MCB BUFFER CONTROL PROCESSING routine is executed at step #10. This routine will be explained using FIG. 12 later. Thereafter, received data are transformed into intermediate codes by a RECEIVED DATA PROCESSING routine (step #11 and see FIG. 15) to store transformed intermediate codes in FIFO 305. In other words, the first information processor 320 transfers data, via FIFO 305, to the second information processor 330 in the style of intermediate codes. These intermediate codes include respective values of write addresses for BM-RAM 32 which are calculated according to selected font pattern and font size and, accordingly, they are deemed as pre-edited data.

The reason why the font attribution is read at step #6 is to pre-edit data in asynchronous with imaging of characters executed by the second information processor 330.

Further, if RECF flag is set at step #12 (See step #221 of FIG. 17), the process enters into RECOVER PROCESSING routine at step #13. After executing this routine, RECF flag is rest at zero and the process returns to step #7.

Figure 12A:
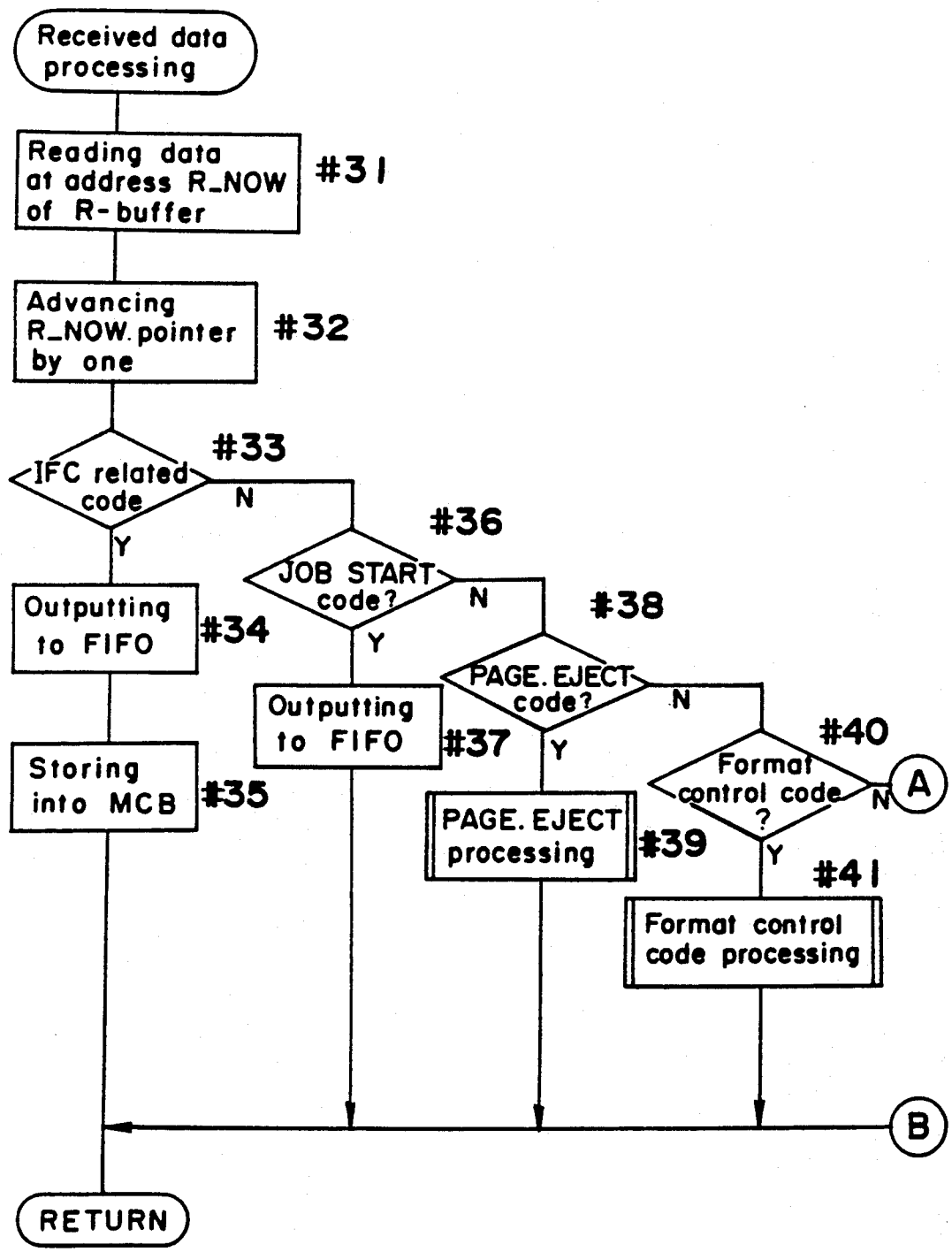
FIGS. 12 (a) and 12(b) shows a flow charts of RECEIVED DATA processing.
Figure 12B:
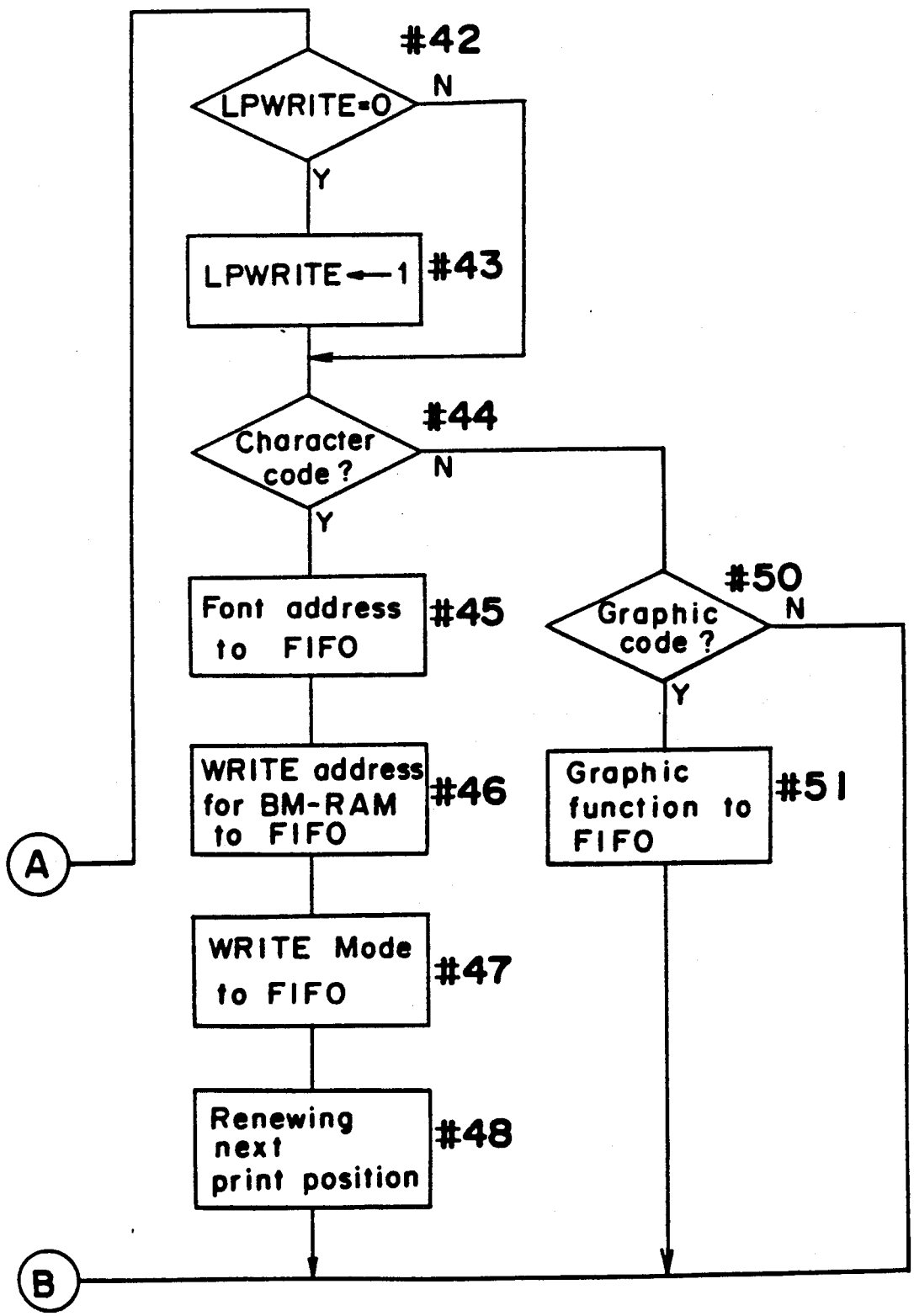

FIGS. 12(a) and 12(b) show a flow chart for the RECEIVED DATA processing.

<c-2> MCB buffer control

FIG. 11 shows a flow chart for MCB buffer control routine.

Before entering into the explanation thereof, MCB memory 210 is explained in order for better understanding of this control routine.

[Function of MCB buffer]

In each MCB control information for imaging into BM-RAM and for options is memorized. Concretely, it includes data as follows;

Size of a paper to be printed and margin of the imaging area

States of options such as No. of bins of the sortor
Mode of protocol (Format of parameter)
Printing data such as the top address of page data in R-buffer 304.

The information of each MCB is initialized to default values when the power source is switched on. However, it can be altered by protocols from the external data processor. Accordingly, it is altered in accompanying with the progress of the printing operation.

The information about the latest page having been processed is not necessary usually. However, it becomes necessary upon reprinting the latest page after recovery from a trouble such as a jam. In order for that, the MCB information about the latest page is held until the printed paper is discharged out perfectly even after the formation of images into BM-RAM has been completed.

When a jam is caused, the printing operation is restarted from the page involved into the jam according to the MCB information corresponding thereto after recovery operation from the jam. The information data are read out based on R_TOP address of R-buffer 304 which is memorized a the top address of the corresponding MCB.

[Management of MCB]

As stated above, MCB buffer 310 is comprised of plural MCBs and the management of these MCBs is made with use of two pointers TASK_TOP and TASK_BOT.

The pointer TASK-BOT indicates the MCB of the oldest page among pages which have not been discharged yet and the pointer TASK_TOP indicates the MCB of the present page in transforming data thereof into intermediate codes. If MCB buffer 310 is fully occupied with successive page data in such a case that plural pages are successively printed (namely TASK_TOP+1=TASK BOT), the printing operation is stopped temporarily and packet transformation into intermediate codes is also suspended.

Referring to FIG. 11 now, in the MCB buffer control routine, if any data is picked up from R-buffer 304, namely LPSTART flag indicating the start of a page data is not set at step #84, the value of R_NOW pointer of R-buffer 304 is written into an MCB at R_TOP address at step #85. Then, MCB data are copied into MCB buffer 310 at step #86 and LPSTART flag is set at one at step #87. The value of R_TOP is not renewed until PAGE. EJECT code indicating the start of the next page is input.

FIGS. 12(a) and 12(b) show a flow chart for the RECEIVED DATA processing.

The received data are classified into four kinds as follows:
IFC related code (print engine related code)
JOB control code (JOB START, PAGE EJECT)
FORMAT control code
Print data (Character code, Graphic code)

At first, the code data indicated by R_NOW pointer is read out from R-buffer 304 at step #31 and R_NOW pointer is advanced by one at step #32. Then, the kind of the code is identified at steps #33, #36, #38 and #40. If it is a print data, the print data is transformed into an intermediate code having a corresponding format to output the latter to FIFO 305. At that time, if no data is written into BM-RAM 32, namely, LPWRITE flag is zero at step #42, the flag is set at one at step #43. If the print data is a character code (YES at step #44), an address of the corresponding font pattern which is calculated at step #45, a write address on BM-RAM 32 corresponding to a print position on the image area A3 which is calculated at step #46 and a WRITE MODE code (step #47) are outputted to FIFO 305 since the format of the character code is same to that for the font image writer 311. In the case of a character code, the next print position is renewed at step #48. If it is a graphic code (YES at step #50), a graphic function code is outputted to FIFO 305 in a format same to that of a command to the graphic image writer 316 at step #51.

If the code data is an IFC related code (at step #33) which is provided for outputting information such as mode information of each option such as a reader to the interface controller 40, it is outputted to FIFO 305 as an intermediate code of function type being different from a type of print data in order for synchronization with print data at step #34. It is also memorized at a predetermined address of MCB as information regarding the present page at step #35.

As JOB CONTROL codes, there are provided PAGE EJECT code for indicating an end of every page and JOB START code for indicating an end of every JOB (every group of pages). If the code data is either one of JOB CONTROL codes (at step #36 or #38), it is outputted to FIFO 305 at step #37 or #39 similarly to the IFC related code. In the case of PAGE EJECT code, PAGE EJECT processing is executed at step #39 (See FIG. 13).

FORMAT CONTROL code is provided for altering the print format. If the code data is a FORMAT CONTROL code (at step #40), FORMAT CONTROL CODE processing is executed at step #41 (See FIG. 14).

[Format control & PAGE EJECT processing]

FIG. 13 shows a flow chart for PAGE EJECT processing.

This PAGE EJECT processing is a kind of imaginary processing for pre-editing data on FIFO 305 as intermediate codes and, accordingly, is different from INTERMEDIATE DATA processing wherein a paper supply action is accompanied. This processing is executed when LPWRITE flag is set at "1" (at step #101). At first, an intermediate code indicating PAGE EJECT is outputted to FIFO 305 at step #102. However, an actual paper discharge is done when the second information processor 330 received the intermediate code from FIFO 305.

At step #102, the next print position is moved to the top position of the image area in preparation for edition of the next page. Further, at step #104, the top address of the next page in R-buffer 304 is set at R_NEXT of the MCB of the present page in MCB buffer 310 which is indicated by TASK_TOP and LPSTART flag is reset at step #105. At step #106, TASK_TOP is renewed to the next page in order to prepare writing of the next page. Then, LPWRITE flag is reset at "0" at step #107. If LPWRITE flag is equal to "0" at step #101, PAGE EJECT processing is not executed to avoid a discharge of an empty page.

Figure 14:
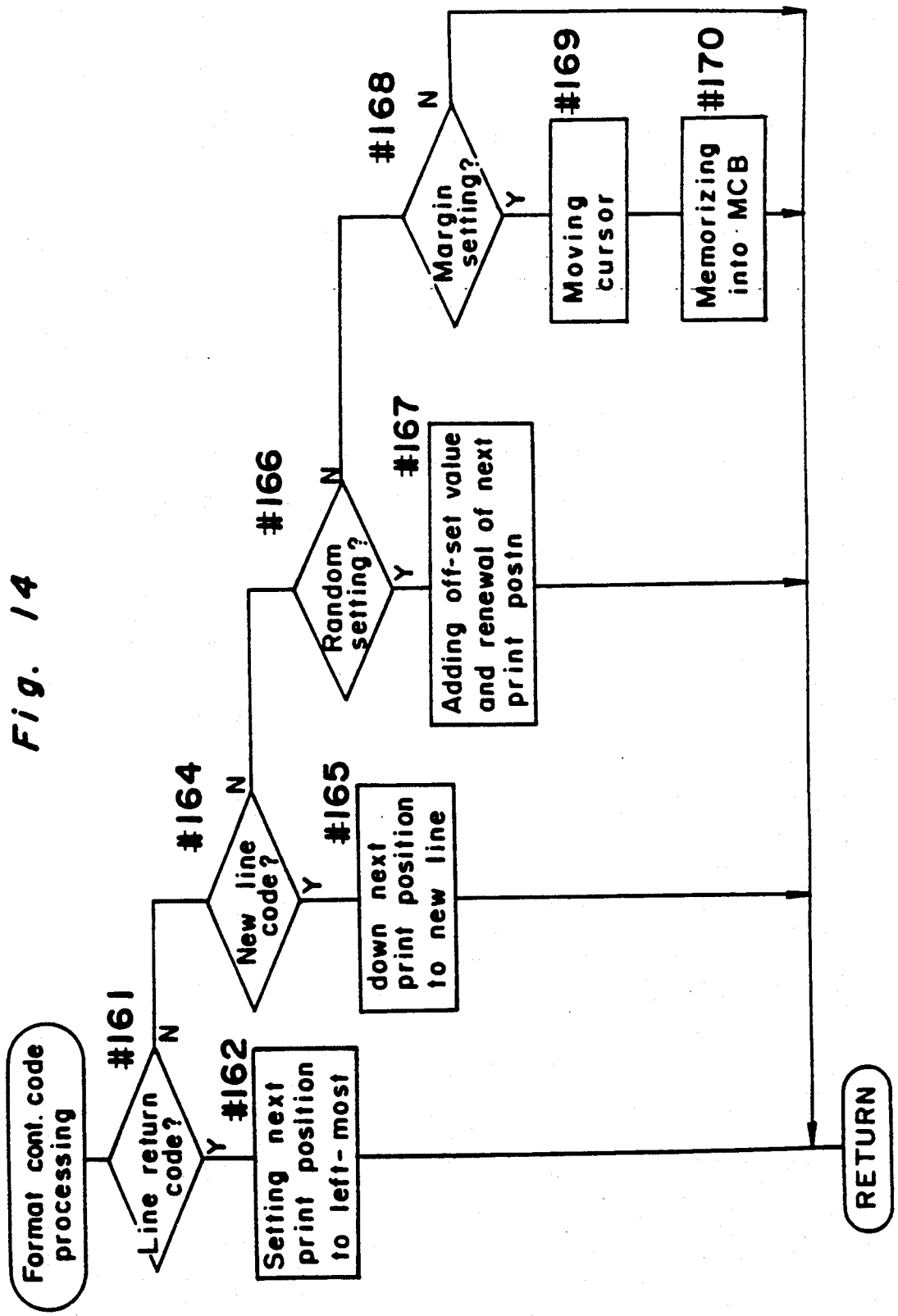
FIG. 14 is a flow chart of FORMAT CONTROL CODE processing.

FIG. 14 shows a flow chart for FORMAT CONTROL CODE processing at step #41 of FIG. 12.

If the code data is a RETURN LINE code at step #161, the next print position is moved to the left-most position A13 of the image area A3 at step #162. If the code data is a NEW LINE code at step #164, the next print position is moved down by one line at step #165. If the code data is a RANDOM DESIGNATION code at step #166, the next print position is renewed by adding an off-set value at step #167. If the code data is a MARGIN SET code at step #168, the cursor is moved at step #169 and, thereafter, margin information of MCB is renewed at step #170.

[JEND & RECOVER interruption processing]

In the present preferred embodiment, interruptions are executed by JEND and RECOVER signals from the second information processor 330 in order for TROUBLE RECOVER processing.

The interruption by JEND signal is started when JEND signal is outputted from the second information processor 330 to the first information processor 320 through JEND signal line. JEND signal is generated by the second information processor 330 when EXPEND indicating completion of discharge of a printed paper from the print engine section including the option apparatus is outputted therefrom.

Figure 16:
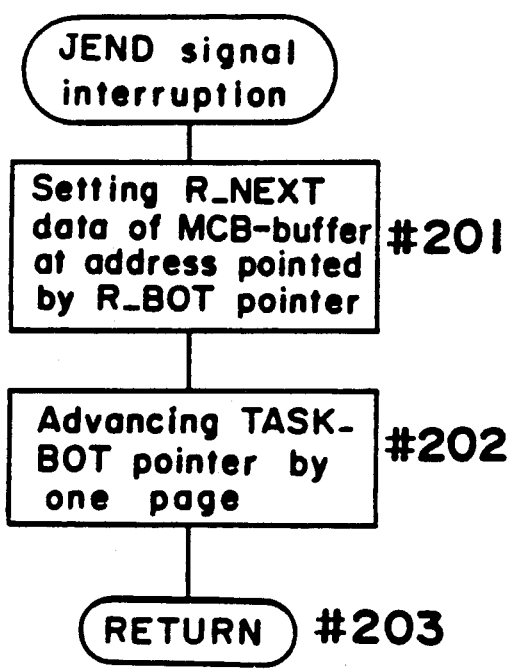
FIG. 16 is a flow chart of JEND signal interruption.

In this interruption processing shown in FIG. 16, data of R-buffer 304 and MCB buffer 310 indicating completion of paper discharge operation and control information thereof are erased. More concretely, value of the address memorized in R_NEXT area in MCB buffer 310 which is indicated by TASK_BOT pointer is set to R_BOT pointer in order to erase the oldest page data in R-buffer 304 at step #201. Further, TASK_BOT pointer is advanced by the length of one page in order to erase the oldest page data in MCB buffer 310 at step #202.

Figure 17:
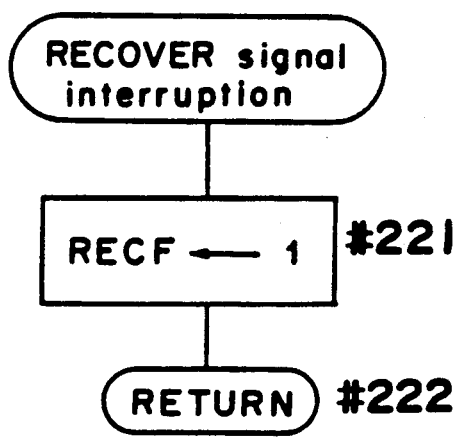
FIG. 17 is a flow chart of RECOVER signal interruption.

FIG. 17 shows a flow chart of RECOVER SIGNAL interruption routine.

This routine is started by RECOVER signal which is sent from the second information processor 330 when it detects recovery from a trouble in the print engine 4 and RECF flag is set at step #221.

Figure 18:
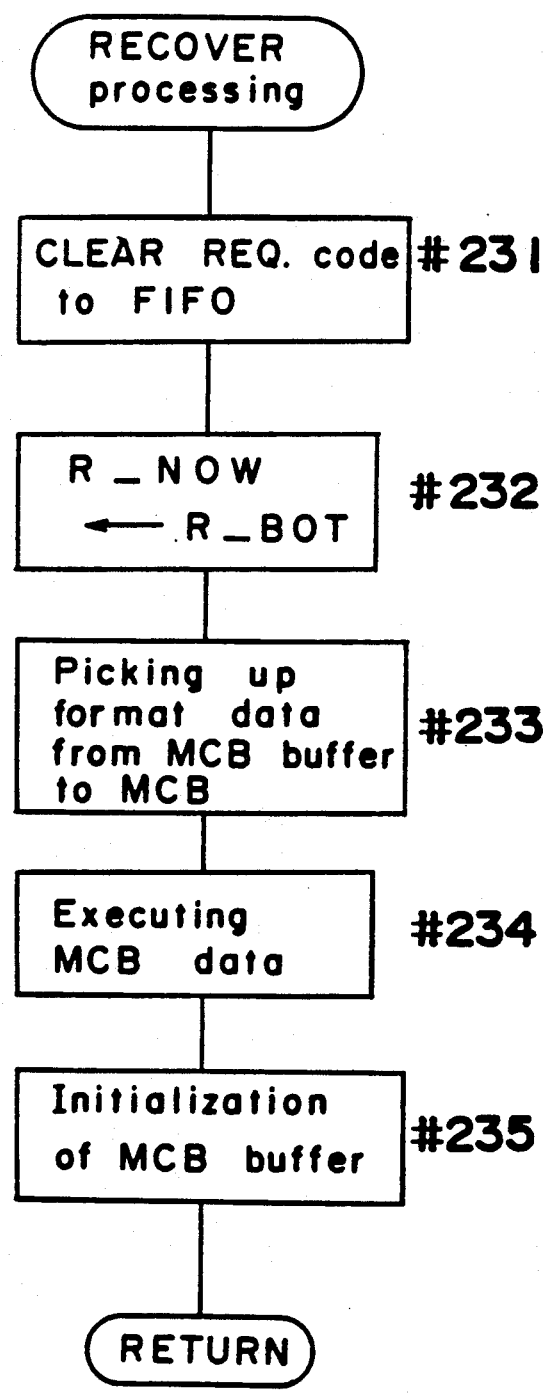
FIG. 18 is a flow chart of RECOVER processing.

FIG. 18 shows a flow chart of RECOVER processing routine.

This routine is executed after executing RECEIVED DATA processing in the main routine shown in FIG. 10 if RECF flag has been set in RECOVER SIGNAL interruption.

At step #231, CLEAR REQUEST (CLREQ) signal is sent from the first information processor 320 to the second information processor 330 in order to indicate a range of data to be erased to the latter. Then, R_NOW pointer as a reading pointer in R-buffer 304 is set at R_BOT indicating the top of the oldest page data at step #232. Next, the page format data indicated by TASK_BOT pointer is picked up from MCB buffer 310 to the corresponding MCB at step #233 and an OPTION mode is sent to FIFO 305 as an intermediate code according to the content of the page format data in order to set the EDITION mode or the OPTION mode again at step #234. Then, MCB buffer 310 is initialized at step #235. Thus, the state in that the first information processor 320 started to process the page data in trouble is resumed and the printing can be done in the same format as before.

<c-2> Routine by 2nd information processor

FIGS. 19 to 24 show respective flow charts of routines to be executed by the second information processor 330.

Figure 19:
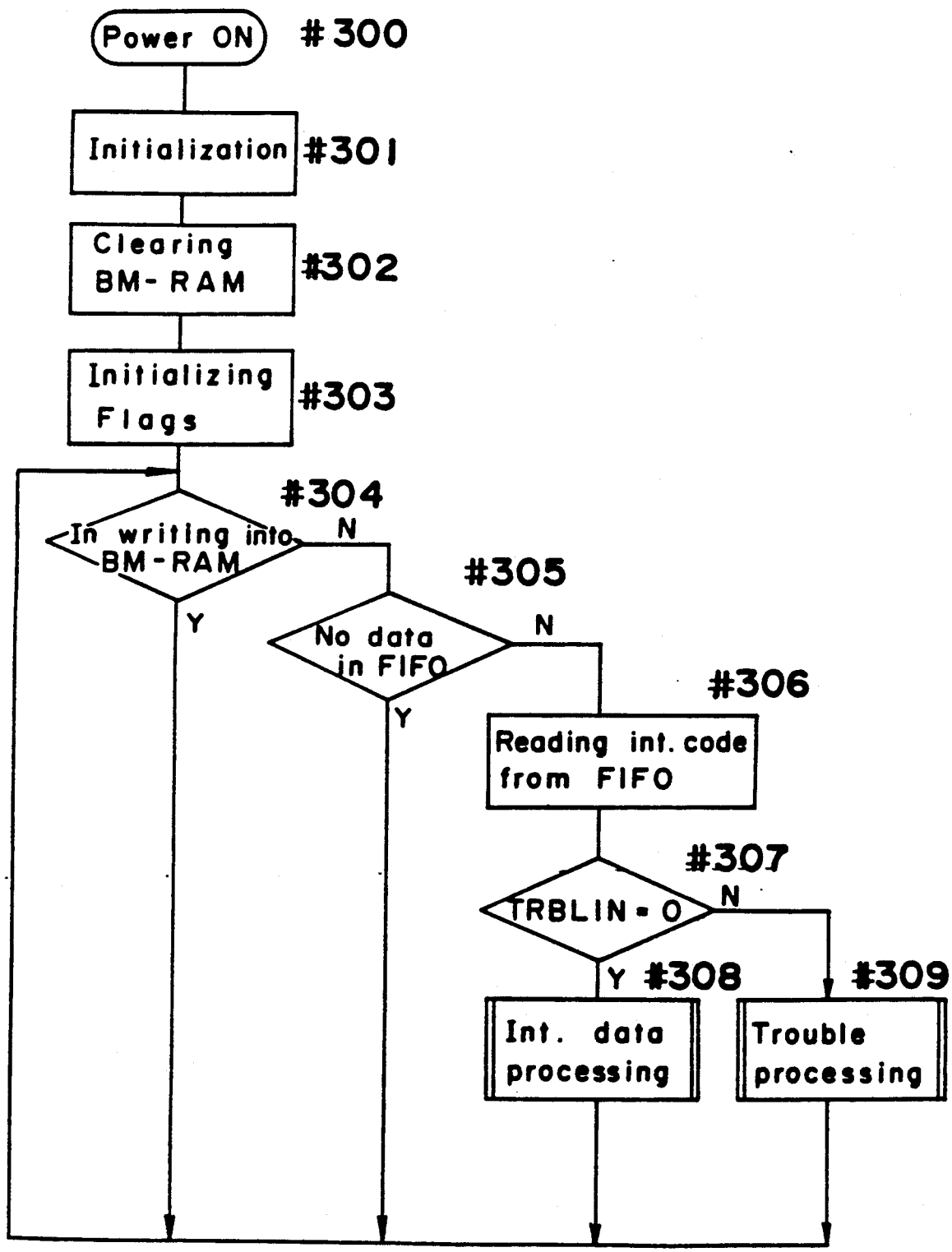
FIG. 19 is a flow chart of the main routine to be executed by the second information processor.

In FIG. 19 showing the main routine, when the power is turned on at step #300, an internal initialization is done at step #301, the image area A3 of BM-RAM 32 is cleared at step #302 and control flags are initialized at step #303. More concretely, BMWRITE flag indicating the writing state into BM-RAM 32, TRBLIN flag indicating that a trouble is caused in the print engine 4, TRBLOUT flag indicating the completion of the trouble processing and EPEND flag indicating the receipt of EXPEND command are cleared.

After the initialization of these flags, the process enters into the main loop which includes processing for intermediate codes from step #306 to step #308, a print sequence control and a trouble processing (step #309).

Before executing these processings, it is checked whether or not BM-RAM 32 is in writing and also, it is checked whether or not there is at least one data in FIFO 305 at steps #304 and #305, respectively. The trouble processing at step #309 is executed when TRBLIN flag has been set at one by the interruption processing from the print engine 4.

[INTERMEDIATE CODE processing and PRINT SEQUENCE control]

Figure 20:
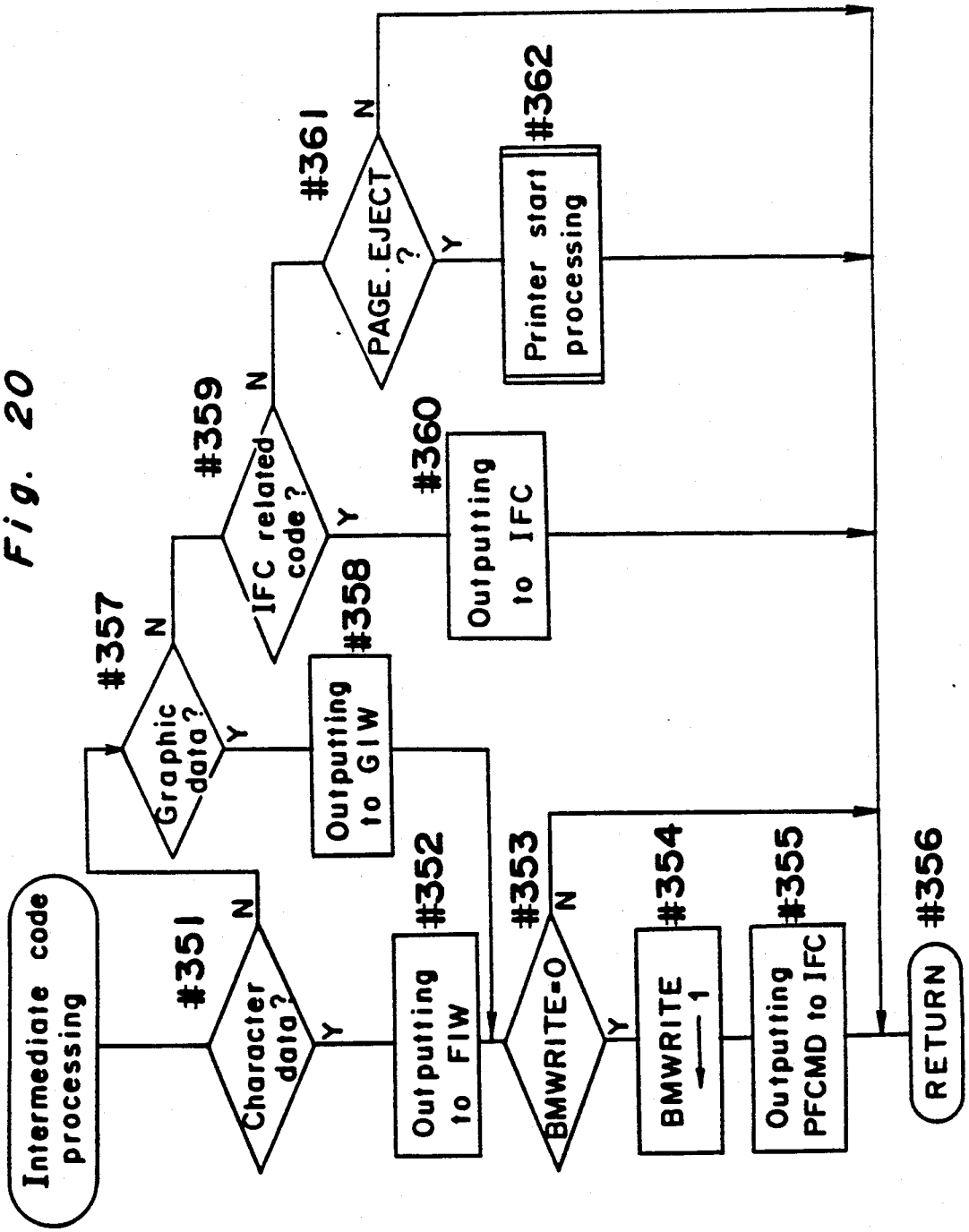
FIG. 20 is a flow chart of INTERMEDIATE CODE processing.

FIG. 20 shows a flow chart of the processing for intermediate codes (#308).

In this processing, an imaging of a bit image onto BM-RAM 32 according to an intermediate code read from FIFO 305 and a sequence control for the print engine 4 by outputting commands thereto are executed. At first, an intermediate code having been stored in FIFO 305 is read out at step #351. If it is a character data (YES at step #351), it is outputted to the font image writer (FIW) 311 at step #352. If it is a graphic data (YES at step #357), it is outputted to the graphic image writer (GIW) 316 at step #358.

If it is the first data to be written, namely, BM-WRITE flag is equal to "0" at step #353, the flag is set at "1" at step #354. At step #355, PFCMD command for prefeeding a blank paper is outputted to the interface controller 40 in order to make the print engine 4 perform a preparation for printing. Due to this step, an exposure by the laser beam to the photoconductive drum can be started as soon as the preparation for printing has been completed in the bit map data processor 3. Accordingly, the throughput of data is improved.

In the case of IFC related code (at step #359), the code is outputted to the interface controller 40 at step #360.

Figure 23:
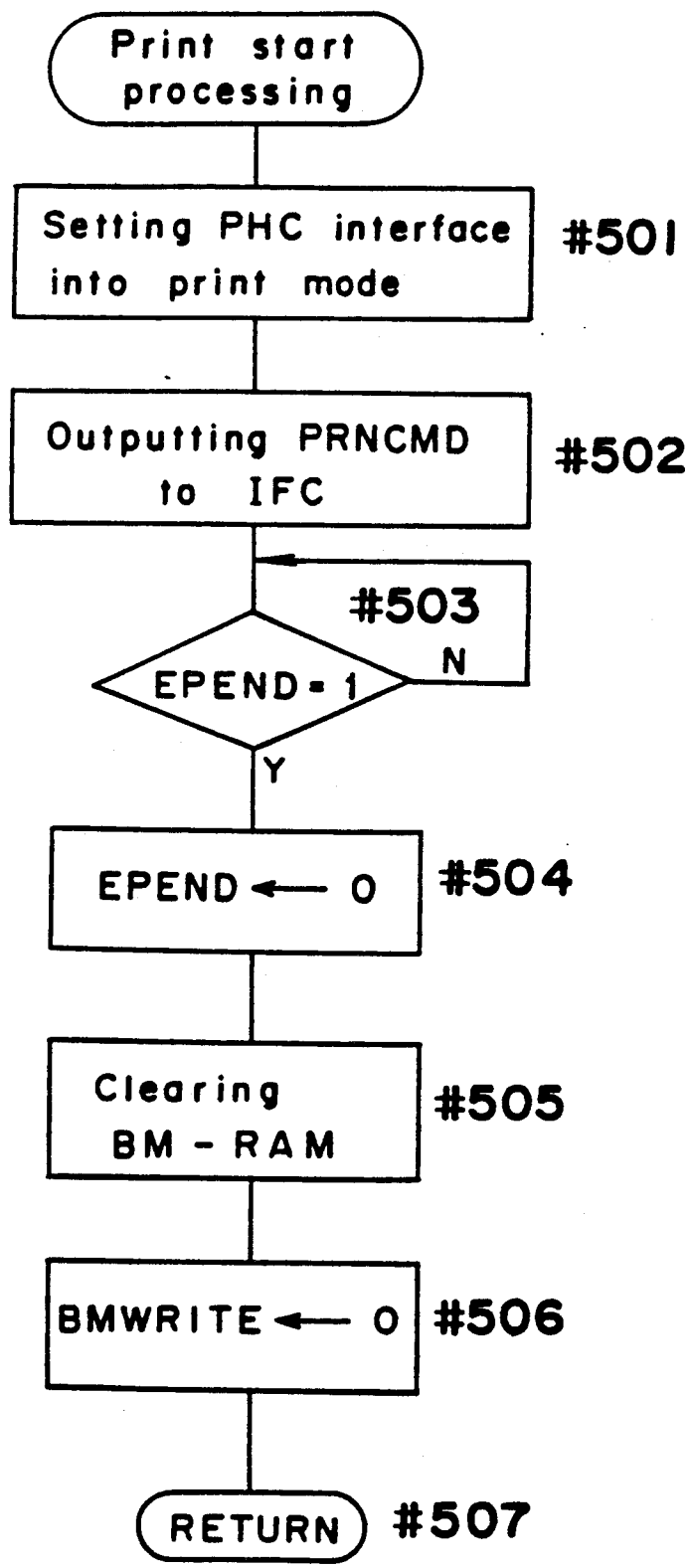
FIG. 23 is a flow chart of PRINT START processing.

Though the output of intermediate codes from FIFO 305 to the bit map writer 31 is continued as far as they are remaining in FIFO 305, if PAGE EJECT code is detected at step #361, PRINTER START processing is executed at step #362 since data transformation of one page has been finished (See FIG. 23).

In PRINTER START processing, the print head controller interface 315 is set into the print mode at step #501 and PNCMD as a print command is outputted to IFC 40 at step #502. Thus, the print head controller interface 315 outputs data of BM-RAM 32, via the bus B4, to the print head controller 42 in synchronization with pulses sent from the control circuit 426 of the print head controller 42.

Then, the process waits until EPEND flag is set at one at step #503. This flag is set by EXPEND signal from the print head controller interface 315. When it is set, the process advances to step #504 in order to reset it. Then, at step #505, BM-RAM 32 is cleared and BMWRITE flag is reset at step #506.

[TROUBLE RECOVERY processing]

Figure 24:
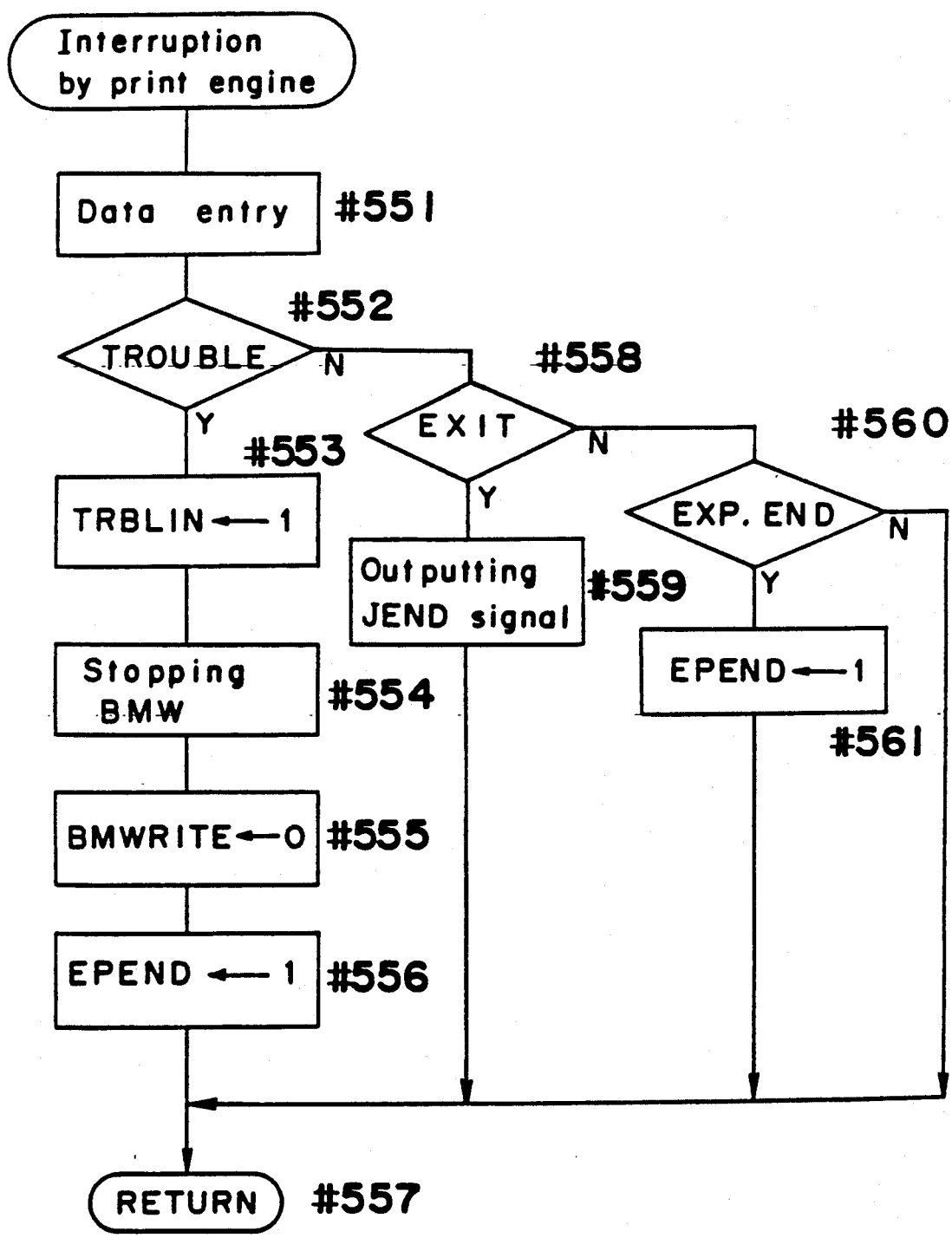
FIG. 24 is a flow chart of an interruption routine by the print engine.

As shown in FIG. 24, when TROUBLE command is sent from the print engine 4 by detecting a trouble therein, an interruption processing is started from step #552. Namely, if the data input at step #551 is TROUBLE command, TRBLIN flag indicating occurrence of a trouble is set at step #553 and the imaging operation to BM-RAM 32 is stopped at step #554. At step #555, BMWRITE flag is cleared and EPEND flag is forcibly set at one at step #556.

If TRBLIN flag is set at step #307 in the main routine shown in FIG. 19, TROUBLE processing is executed at step #309.

Figure 21:
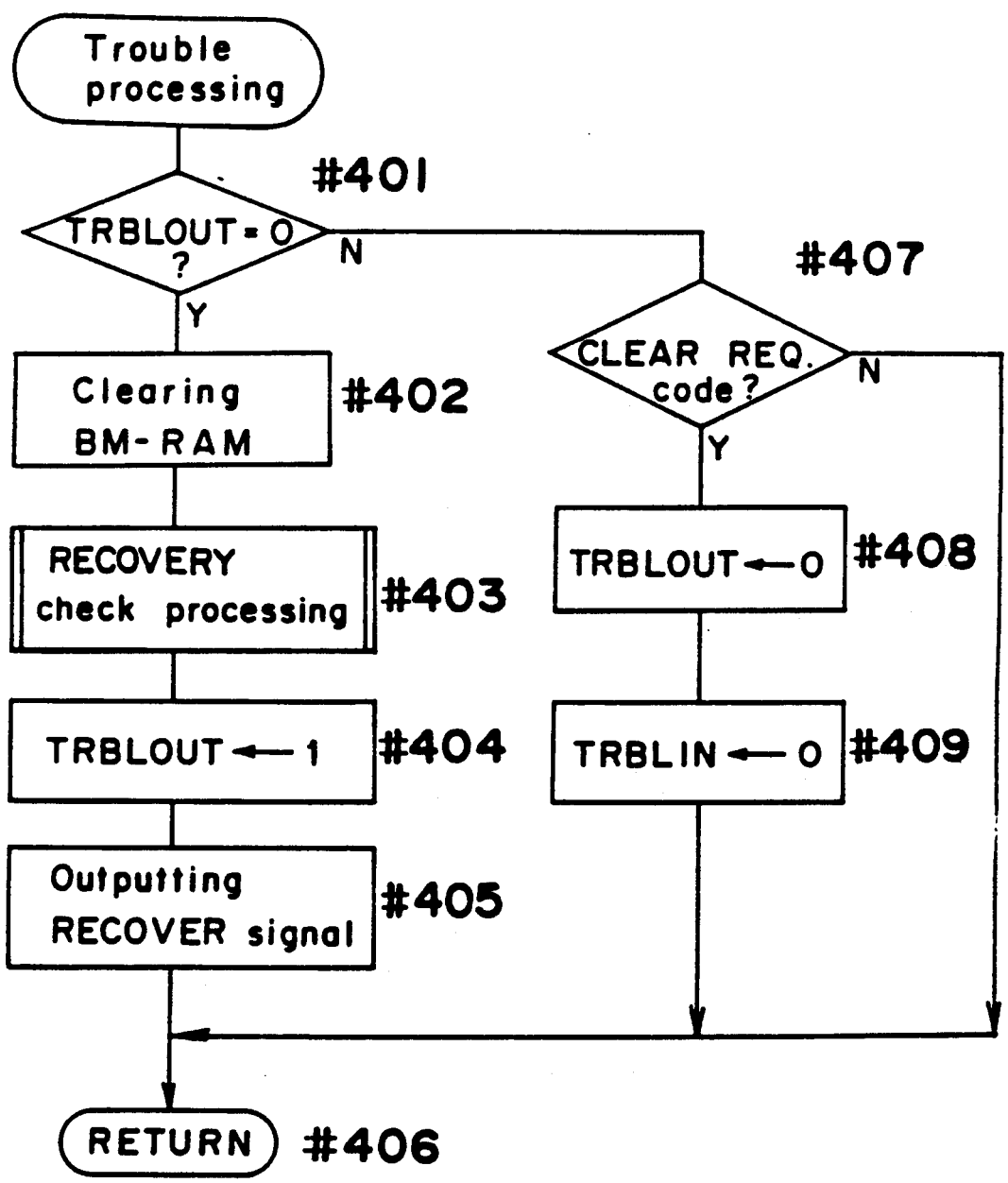
FIG. 21 is a flow chart of TROUBLE processing.

FIG. 21 shows a flow chart of TROUBLE processing.

Figure 22:
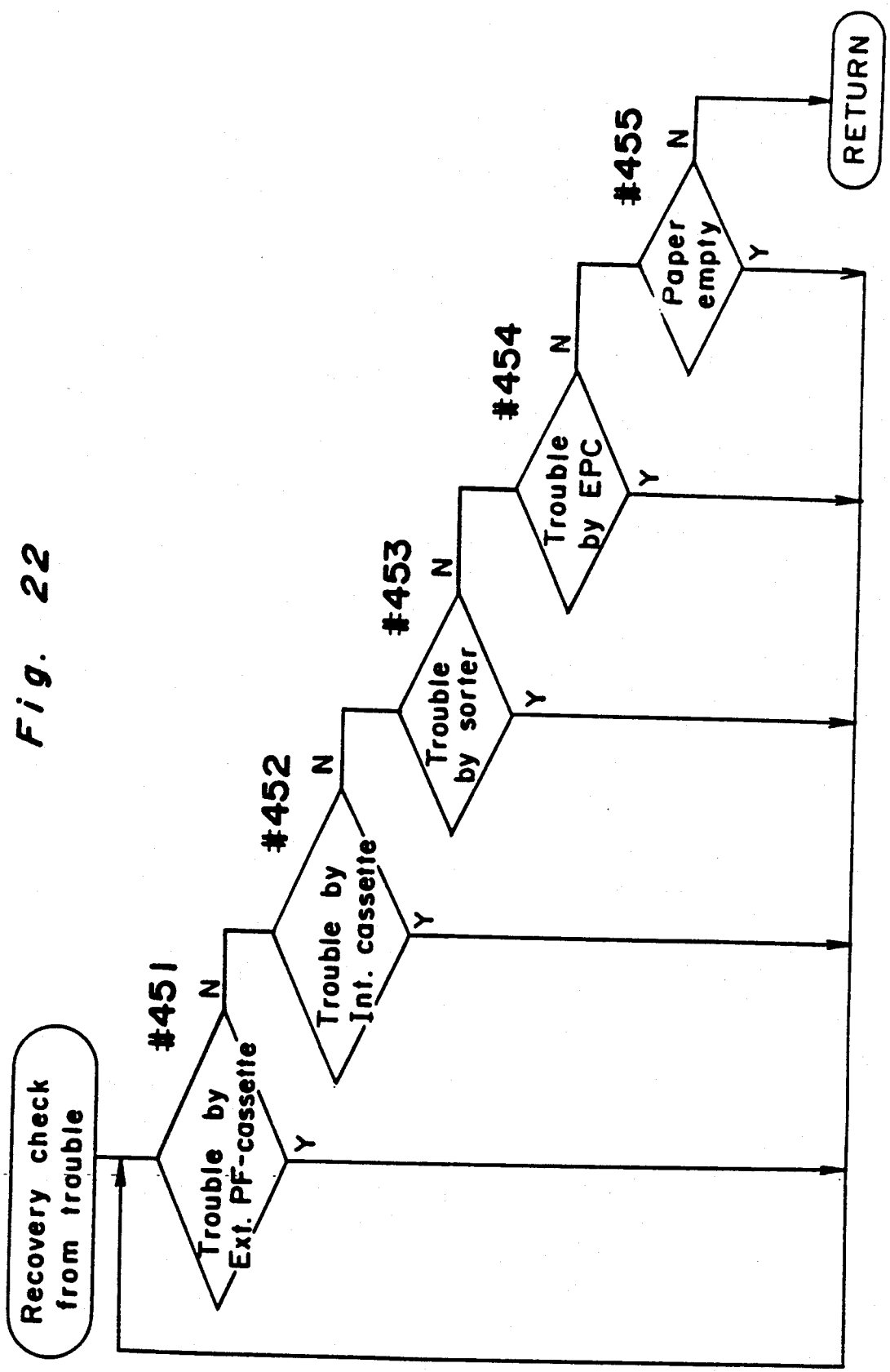
FIG. 22 is a flow chart of RECOVERY CHECK processing.

Since TRBLOUT flag is not set at the first stage of the processing at step #401, the process advances to step #402 in order to clear BM-RAM 32 and, then, TROUBLE RECOVERY CHECK processing is executed at step #403 (See FIG. 22).

In TROUBLE RECOVERY CHECK processing, as shown in FIG. 22, states of respective portions of the print engine 4 are checked from step #451 to step #455 and these steps are repeated until no trouble is checked in the print engine 4. when the print engine 4 is recovered from the trouble, the process returns to step #404 of TROUBLE processing in order to set TRBLOUT flag. Then, the second information processor 330 send RECOVER signal to the first information processor 320 through RECOVER signal line at step #405.

If the process enters into TROUBLE processing next time, it returns without clearing TRBLIN flag until CLREQ code indicating CLEAR REQUEST command is sent from FIFO 305 since TRBLOUT flag has been set. In the main routine, the process enters into TROUBLE processing routine as far as TRBLIN flag has been set (See steps #307 and #309) and all of data are disregarded to read accordingly until CLREQ code is detected. When CLREQ code is detected, TRBLIN and TRBLOUT flags are reset at steps #408 and #409, respectively and INTERMEDIATE CODE processing is restarted in the main routine.

The first information processor 320 outputs an intermediate code for setting back the format to that of the foregoing page successively to CLREQ code and, thereafter, data are sent from the top of the page involved into a trouble. Thus, all of the page data are rewritten thereby.

Figure 25:
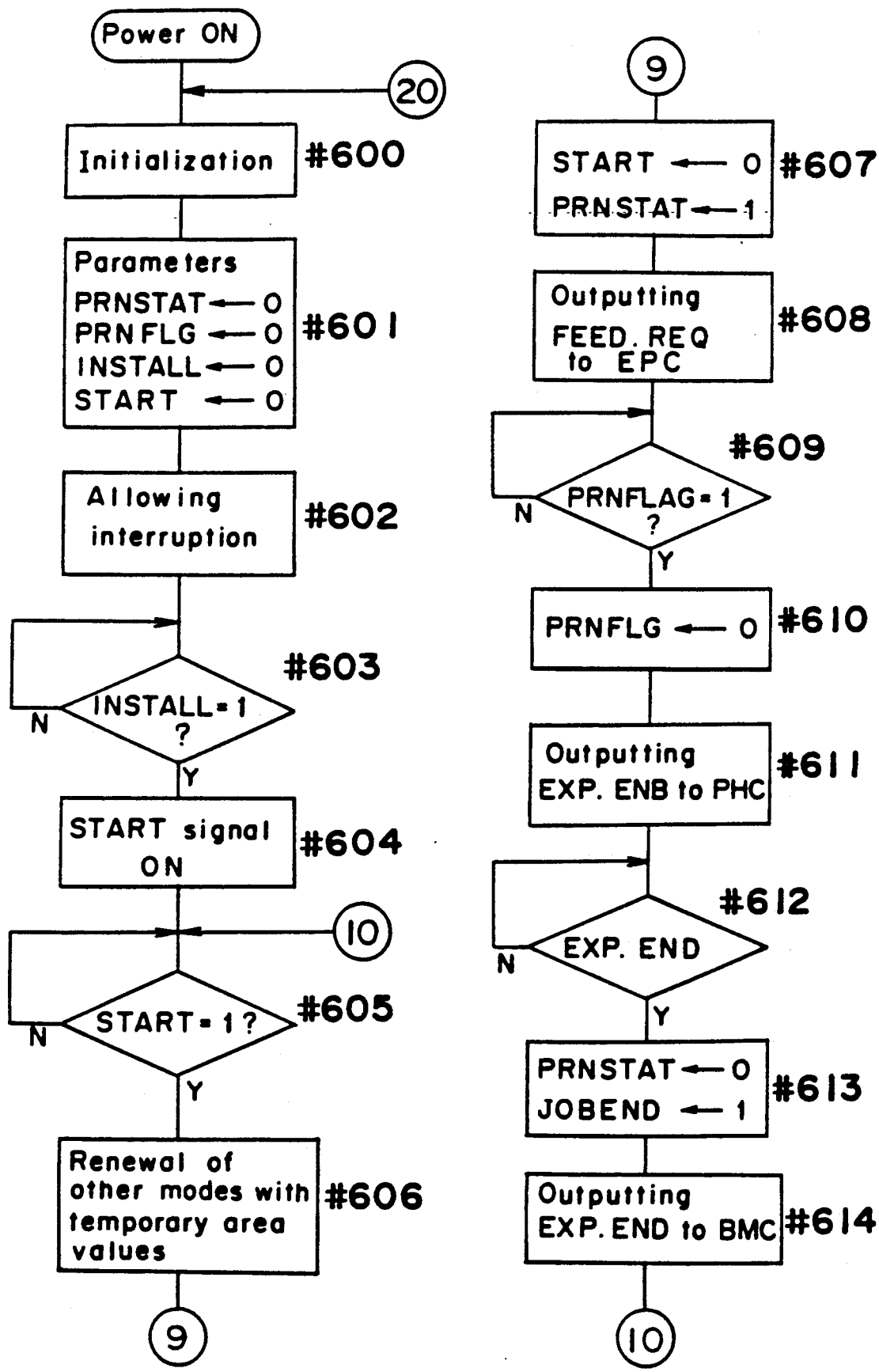
FIG. 25 is a flow chart of the main routine to be executed by the interface controller.

FIG. 25 shows a flow chart of the processing to be executed by IFC 40.

In this routine, an initialization of IFC 40 is executed at first at step #600 and, then, parameters are initialized at step #601. Parameters defined in this routine are as follows;

PRNSTAT ... indicating that the print engine 4 is in printing,
START ... indicating detection of PFCMD from BMC 30 (See steps #657 and #658 in FIG. 26),
PRNFLAG ... indicating detection of PRNCMD from BMC 30 (See steps #659 and #660 in FIG. 26), and
INSTALL ... indicating completion of checking the initial state of the print engine 4 (See steps #715 and #716 in FIG. 27).

After initializing these parameters, two interruptions which will be explained later are allowed at step #602 and, if no trouble is detected in the print engine 4, namely INSTALL=1 at step #603, START signal is sent, via the bus B5, to the sorter 6, the external paper feeding unit 5, the electro-photographic process controller 41 and PHC (print head controller) 42 at step #604, respectively and, thereby, the process enters into the following processing routine.

Figure 26:
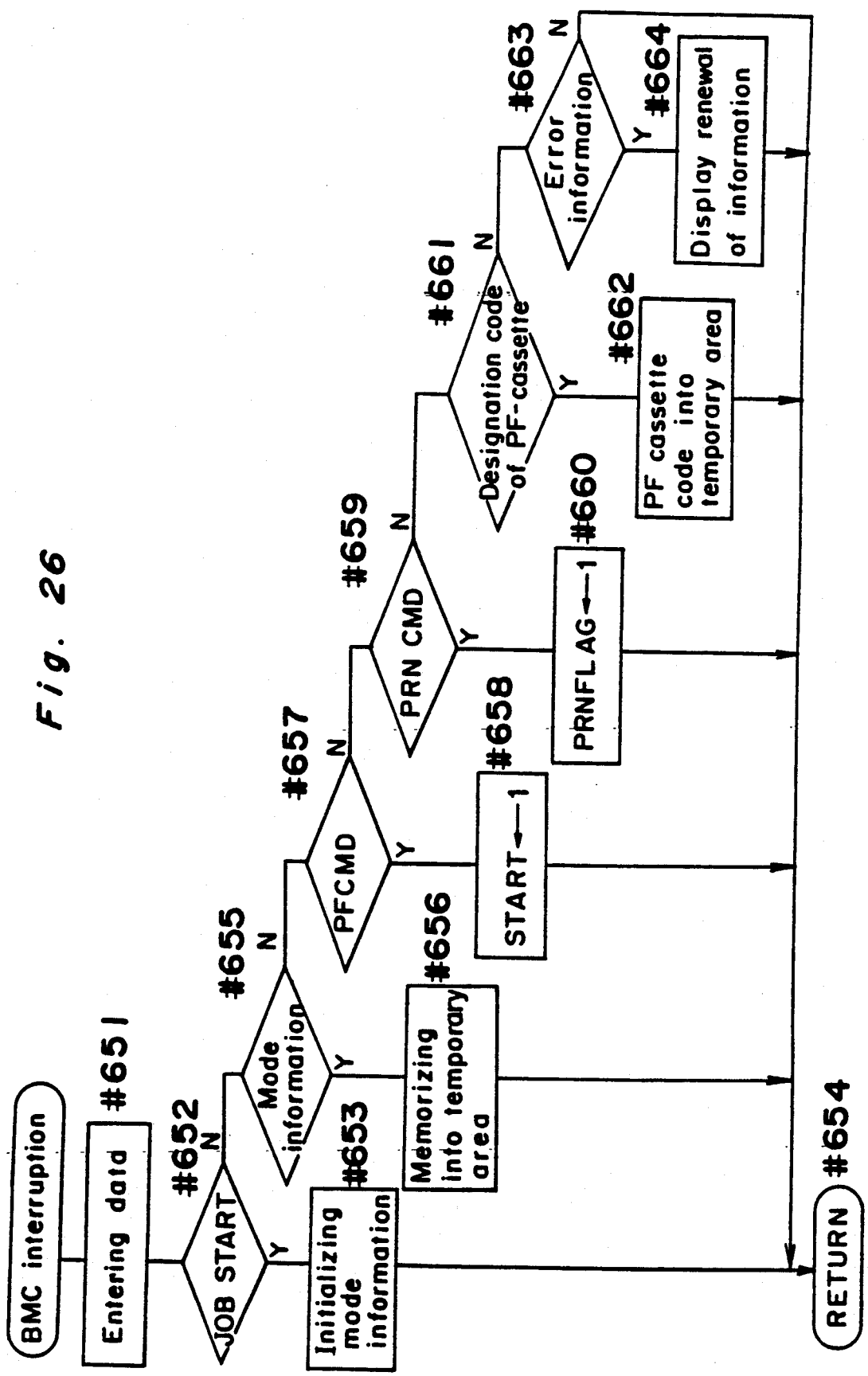
FIG. 26 is a flow chart of BMC interruption.

Meanwhile, as interruptions, there are provided BMC interruption shown in FIG. 26 and SYSTEM TIMER interruption shown in FIG. 27. The existence of a trouble in the print engine is checked by SYSTEM TIMER interruption and is confirmed by INSTALL flag in the main routine.

Before entering into the explanation of the processing routine, these two interruption routines are explained, respectively.

In BMC interruption, commands sent from BMC 30 are processed to set flags defined for IFC 40. But, actual processings according to these command are executed when individual flags having been set in this BMC interruption are detected in the processing loop. This is intended to asynchronize the communication between the processing loop and BMC 30. Therefore, the processing loop can be simplified. Two flags PRNFLAG and START are set in this interruption routine. PRNFLAG is set at step #660 when PRNCMD command indicating the start of an exposure is detected at step #659 and START flag is set at step #658 when PFCMD command to be outputted upon feeding a paper is detected at step #660.

Further, if the command is JOB START command at step #652, mode information is initialized at step #653. If it is mode information such as printing mode, mode of an accessory or the like at step #655, it is memorized in a temporary area once at step #656. Thus, it is duly picked up in the processing loop. If it is a designation code for the paper feeding cassette at step #661, the code is memorized in a temporary area at step #662. Also, if it is an error code at step #664, display information on the display panel is renewed at step #664.

Nest, SYSTEM TIMER interruption is explained referring to FIG. 27.

If this interruption routine, output and input processing for the display panel (steps #701 and #702), count processing for the timer set in the processing loop (step #703) and checks for individual portions of the print engine (steps #705, #708 and #711) are executed. If any change to be informed to BMC is detected, it is outputted to BMC at either one of steps #706, #709 and #712. Further, the size of the paper feeding cassette and the existence of paper therein are checked in order to inform to BMC (at steps #704 to #706). Also, the existence of trouble is checked at step #715. If it is detected at step #719, the information thereof is outputted to display it on the display panel at step #720.

If no trouble is detected at step #715, INSTALL flag for indicating the normal state of the print engine to the processing loop is set at step #716.

Hereafter, the processing loop of FIG. 25 is explained.

At the first stage of the processing loop, the process waits for PRINT START request (step #605) and when START is set, number of prints and mode information regarding accessories are renewed at step #606. In the case of multiprints, START is reset and PRNSTAT indicating PRINT mode is set at step #607. Then, FEEDREQ signal for requesting a paper feeding is outputted to the electro-photographic process controller 41 through the bus B5 in order to perform the first print at step #608. According to this signal, the EP process controller 41 starts the paper feeding and the electro-photographic processing section 45. The paper is stopped at a predetermined position. If the external paper feeding unit 5 is designated, the EP process controller 41 starts only the electro-photographic processing section 45 and the paper feeding operation is performed by the external paper feeding unit 5. However, the paper is stopped at the same position as in the case of the internal paper feeding unit.

Then, the interface controller 40 waits for PRNCMD (print command) at step #609. When PRNFLAG indicating receipt of PRNCMD is set at step #609 (See steps #659 and #660 of FIG. 26), PRNFLAG is reset at step #610 and, then EXPENB signal indicating the allowance of exposure is outputted to the print head (PH) controller 42 at step #611. Due to this signal, PH controller 42 performs an exposure.

When EXPEND indicating the end of exposure is detected at step #612, PRNSTAT is reset and JOBEND is set at one at step #613. Then, PH controller 42 outputs EXPEND signal to BMC at step #614.

Also, the interface controller 40 controls communication among individual portions in the print engine 4 and has an interconnection function therefor. However, the explanation thereabout is omitted because these functions are not related to the subject matter of the present invention.

[Second preferred embodiment]

Figure 28:
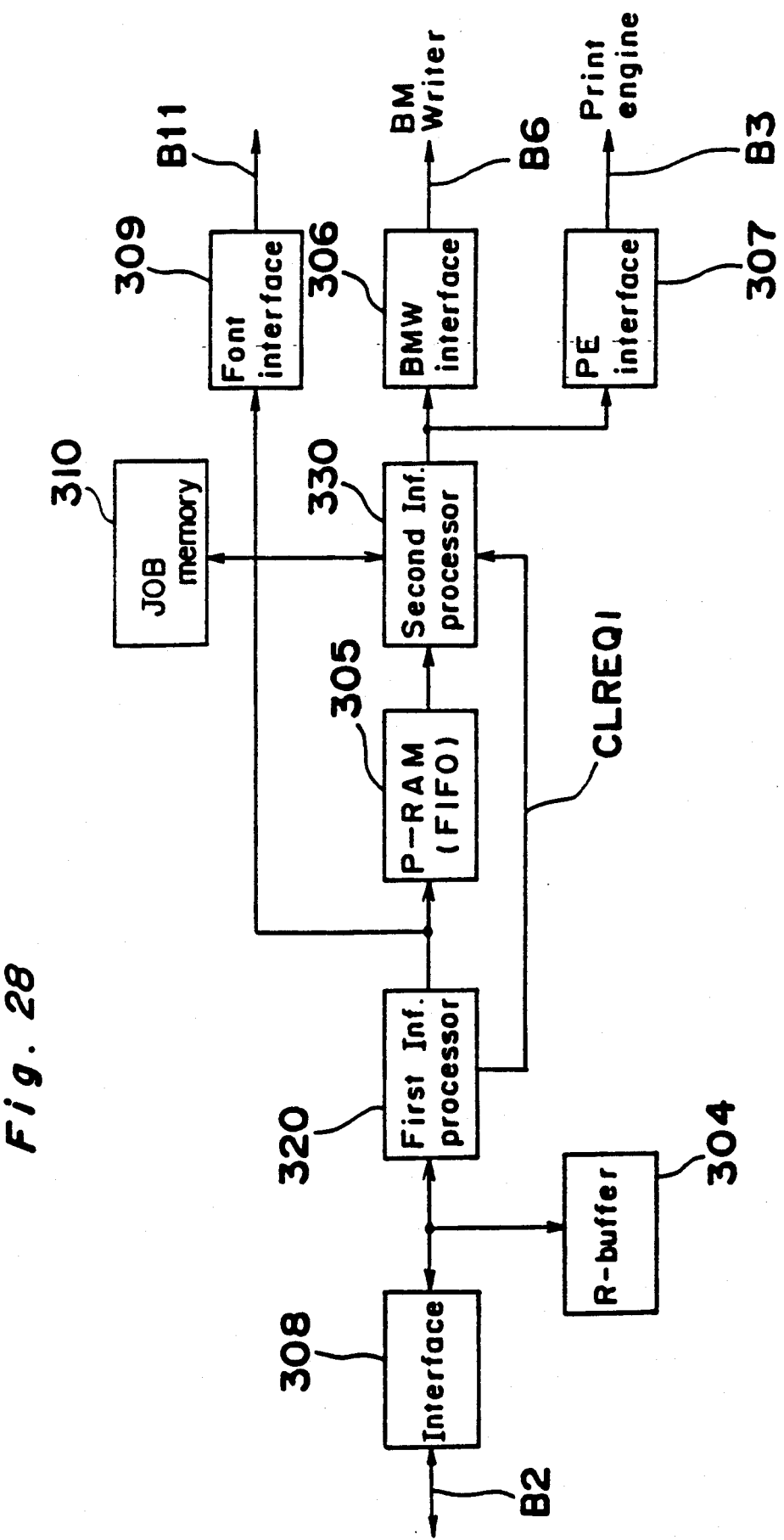
FIG. 28 is a block diagram of the bit map controller according to the second preferred embodiment of the present invention.

FIG. 28 shows a composition of the bit map controller (BMC) 30 according to the second preferred embodiment of the present invention.

As is apparent from comparison of FIG. 28 with FIG. 5, in this preferred embodiment, the second information processor 330 provides JOB memory 310 in place of the first information processor 320 and the former processor 330 is connected to the latter one 320 directly by CLREQ 1 signal line.

Thus, according to the second preferred embodiment, intermediate codes read from FIFO 305 are started once into JOB memory 310 in unit of page and data of the current page in printing are held therein until it is completely discharged.

Figure 29A:
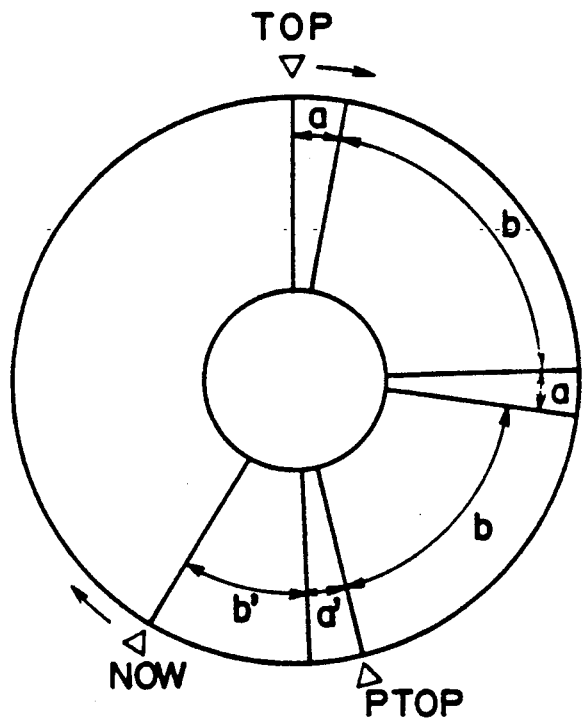
FIGS. 29 (a) and 29 (b) show structures of JOB memory and MCB; respectively.

FIG. 29(a) shows a composition of JOB memory 310. This memory is comprised of a ring buffer and the address management thereof is done with three pointers TOP, PTOP and NOW. TOP pointer indicates the top address of the oldest page data, PTOP pointer indicates the top address of the page data in analyzing at the present time and NOW indicates an address of the current data in writing at the present time. Each block for the page data is comprised of an MCB stack area (a) of a predetermined constant value and a JOB memory area (b) wherein intermediate codes are stored as they are.

Figure 29B:
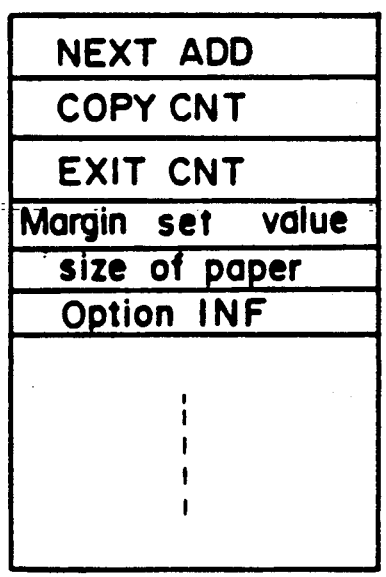

As shown in FIG. 29(b), MCB stack area is comprised of NEXTADD area for holding the top address of the next page block, COPYCNT area for memorizing the number of prints, EXITCNT area for memorizing a number of copies having been discharged already and other areas for memorizing parameters necessary for page edition such as the value of the margin and the paper size set upon starting the page edition.

Namely, each block has the same composition as of MCB shown in FIG. 6(a) of the first preferred embodiment.

Thus, if any trouble is detected regarding the print engine, all of data of the page involved in the trouble are sent to the print engine 4 through the second information processor 330 after recovery from the trouble.

Structures of the bit map type data processor of the second preferred embodiment other than that of BMC are substantially same as those of the first preferred embodiment.

[Bit map control]

As stated in the first preferred embodiment, the first and second information processors 320 and 330 execute their own main routines in asynchronous with each other.

[1] Processing flows by FIP 320

(a) Main flow

FIGS. 30, 31(a), 31(b)-I, 31(b)-II, 32, 33 and 34 show processing flows to be executed by the first information processor 320. These flow correspond to FIGS. 10, 11(a), 11(b), 13, 14 and 15 of the first preferred embodiment, respectively.

Figure 30:
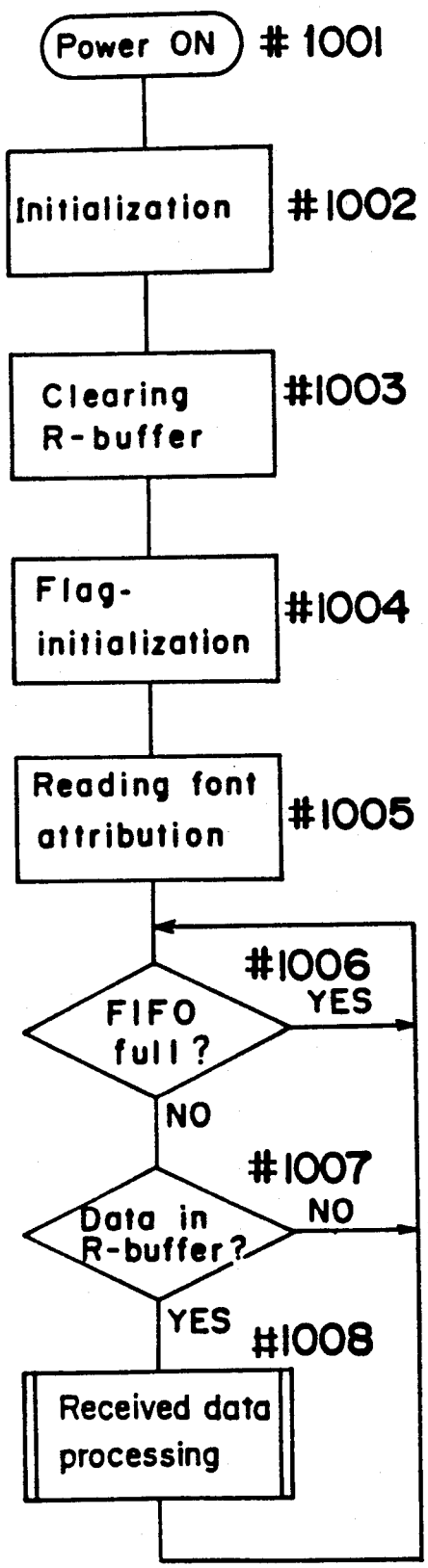
FIG. 30 is a flow chart of the main routine to be executed by the first information processor in the second preferred embodiment.

FIG. 30 shows the main routine to be executed by the first information processor 320.

As is apparent from comparison of FIG. 30 with FIG. 10 showing the main flow in the first preferred embodiment, the main flow in this preferred embodiment is simplified since the first information processor 320 does not provide MCB buffer and, therefore, steps related thereto and RECOVER processing are omitted. Steps from #1001 to #1008 of FIG. 30 correspond to steps #1, #2, #3, #5, #6, #7, #9, #13, respectively.

Accordingly, the first information processor 320 sends intermediate codes processed in step #1008 to the second information processor 330 via FIFO 305, as in the first preferred embodiment.

(b) Received data processing

FIGS. 31(a)-I, 31(b)-I and 31(b)-II show a flow chart of the received data processing which correspond to FIGS. 11(a) and 11(b).

Figure 34:
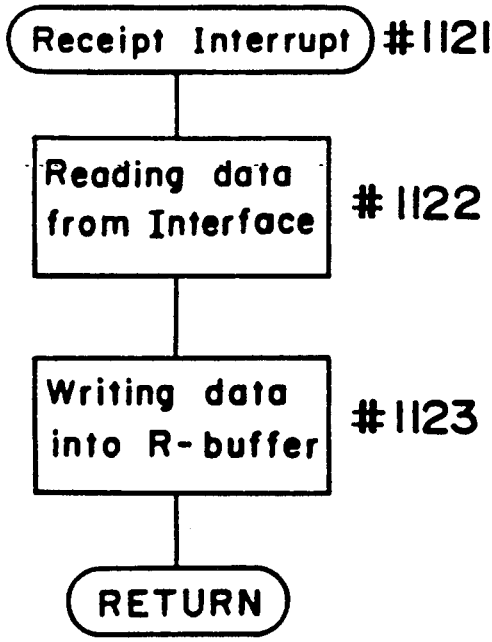
FIG. 34 is a block diagram of RECEIPT interruption.
Figure 36:
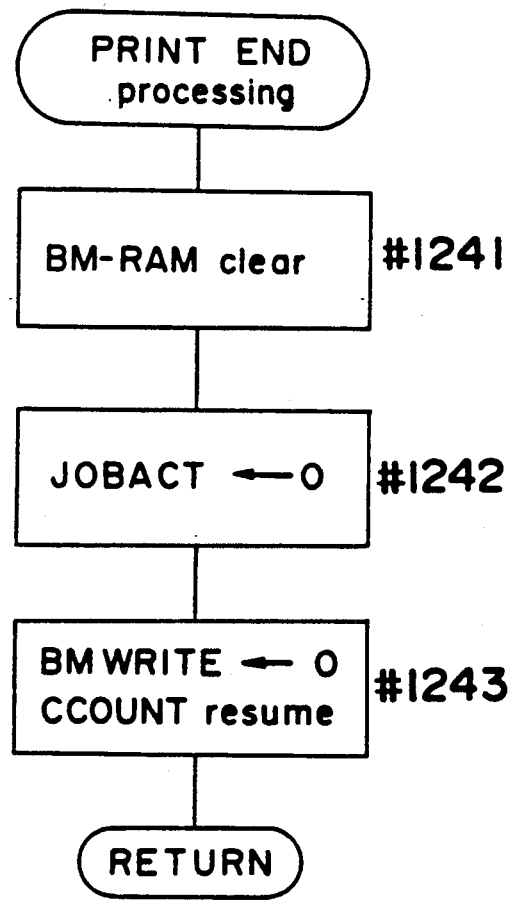
FIG. 36 is a flow chart of PRINT END processing according to the second preferred embodiment.

Meanwhile, the data reading is performed by RECEIPT interruption shown in FIG. 34 which corresponds to FIG. 15 of the first preferred embodiment.

Figure 31A:
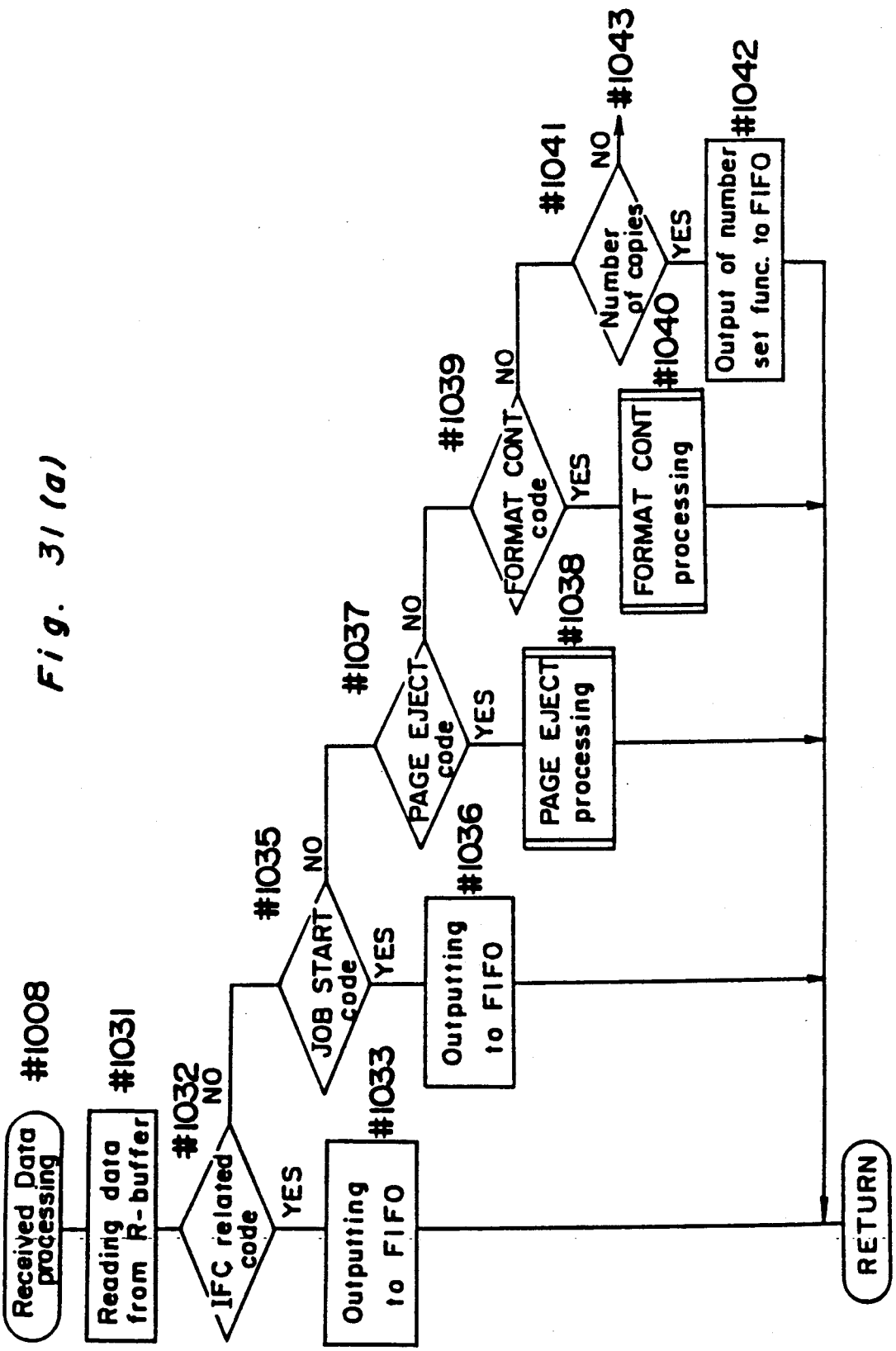
FIGS. 31 (a), 31 (b)-I and 31 (b)-II show a flow chart of RECEIVED DATA processing.

As is apparent from comparison of FIG. 31(a) with FIG. 11(a), a step corresponding to step #35 of the latter is omitted and steps #1041 and #1042 are added in the former. Thus, the flow of FIG. 31(a) is substantially same as that of FIG. 11(a). Also, the flow of FIG. 31(b)-II is same as that of FIG. 11(b).

Namely, in the second preferred embodiment, the flow of FIG. 31(b)-I is newly added for processing CURRENT PAGE CLEAR code and ALL PAGE CLEAR code.

In this flow of FIG. 31(b)-I, if the received data is CURRENT PAGE CLEAR code at step #1043, LPWRITE flag is checked to decide whether or not the first information processor 320 is in pre-editing at step #1044.

If it is set at step #1044, CLREQ function for CLEAR REQUEST is sent to FIFO 305 at step #1045. Next, the cursor is moved to the top address of the next page in order to enable of writing the next page data at step #1046 and the function for setting the number of prints at 1 is sent to FIFO 305 at step #1047. Thereafter, LPWRITE flag is reset at zero at step #1048.

Accordingly, the second information processor 330 can start CLEAR processing thereby when CLREQ function is received from FIFO 305 after starting to image dot images on BM-RAM 32 and, therefore, can execute it in synchronous with printing data.

In the case of ALL PAGE CLEAR code, the first information processor 320 sends a signal directly to the second information processor 330 through CLREQ 1 signal line at step #1051 and, then, clears FIFO 305 at step #1052. Thereafter, the process goes to steps from #1045 to #1048 similarly in the case of CURRENT PAGE CLEAR code.

Thus, the second information processor 330 receives both of CLREQ synchronized with printing data and CLREQ 1 synchronized physically and, accordingly, it becomes possible to know ranges of data to be cleared.

With respect to printing codes, they are processed according to the flow shown in FIG. 31(b)-II which is substantially same to FIG. 11(b).

[ Format control & PAGE. EJECT processing ]

Figure 33:
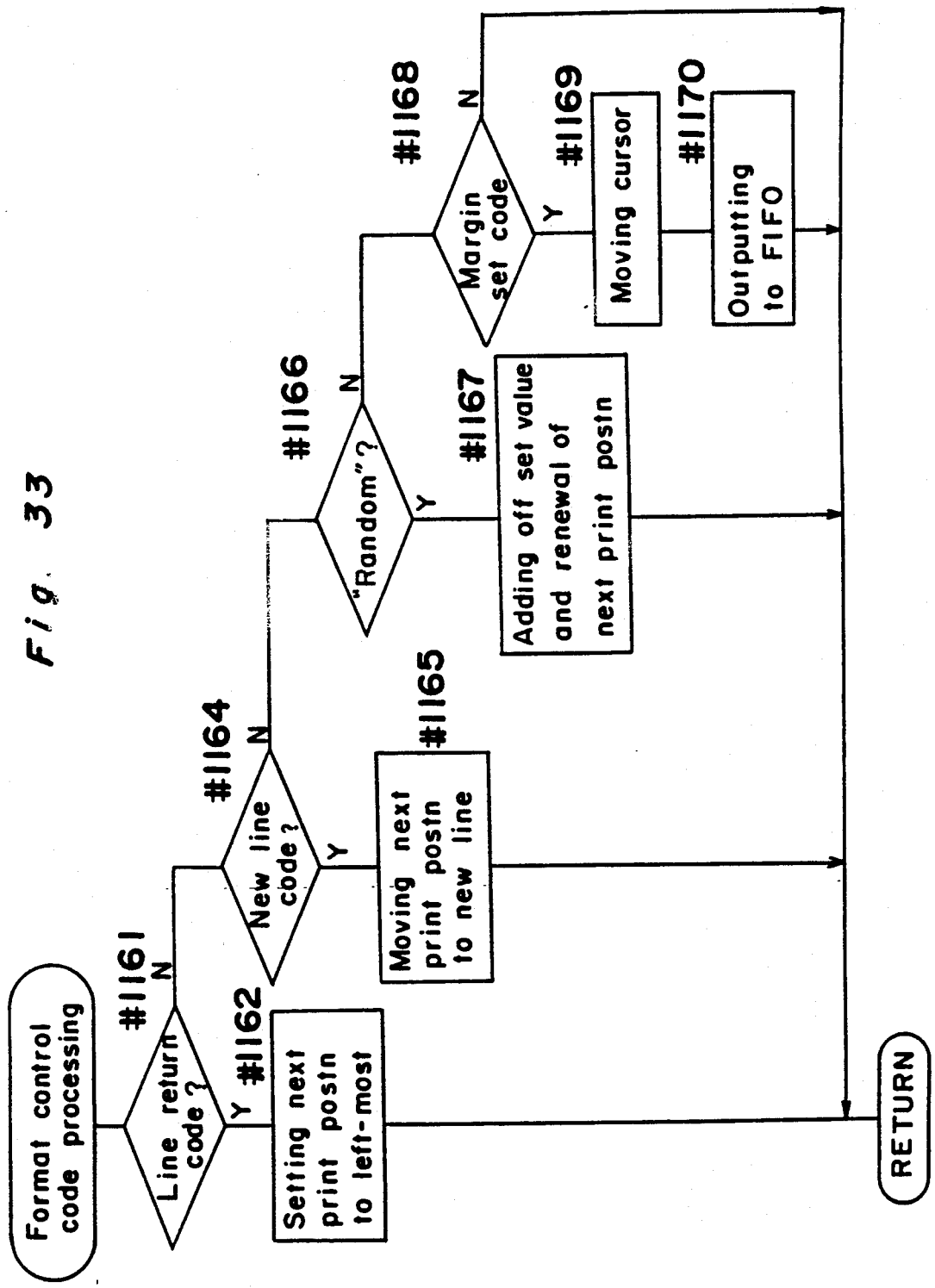
FIG. 33 is a flow chart of FORMAT CONTROL CODE processing.

FIG. 33 shows a flow of FORMAT CONTROL CODE processing which corresponds to FIG. 14 of the first preferred embodiment one to one. Accordingly, the explanation thereabout is omitted.

Figure 32:
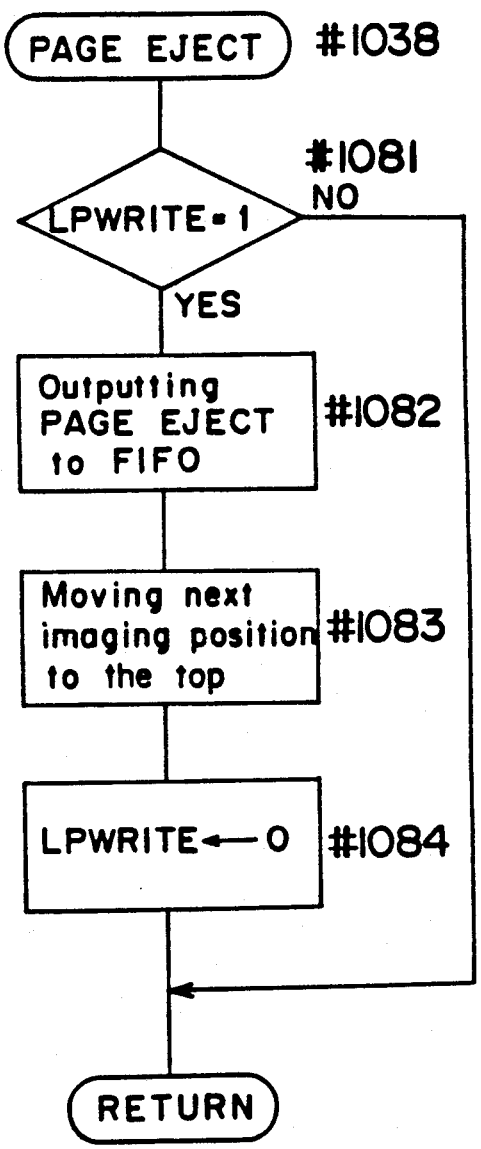
FIG. 32 is a flow chart of PAGE EJECT processing.

FIG. 32 shows a flow of PAGE EJECT processing which corresponds to FIG. 13 of the first preferred embodiment.

As is apparent from comparison of FIG. 32 with FIG. 13, steps #104, #105 and #106 of FIG. 13 are omitted in FIG. 32 because the first information processor 320 does not provide MCB buffer in the second preferred embodiment.

[II] Processing flows by SIP 330

FIGS. 35(a), 35(b), 36, 37(a), 37(b), 38, 39, 40, 41, 42, 43, 44, 45 show flow charts to be executed by the second information processor 330.

Before entering into explanation of these flow charts, correspondence between flow charts in the first preferred embodiment and those in the second preferred embodiment is explained hereinafter. The main routine shown in FIGS. 35(a) and 35(b) corresponds to the main routine shown in FIG. 19 of the first preferred embodiment. Also, the subroutine shown in FIGS. 37(a) and 37(b) corresponds to the subroutine shown in FIG. 20. Further, subroutines shown in FIG. 39, FIG. 42 and FIG. 44 correspond to those of FIG. 23, FIG. 21, FIG. 22 and FIG. 24 in the first preferred embodiment, respectively.

Subroutines shown in FIG. 36, FIG. 38, FIG. 39, FIG. 40, FIG. 41 and FIG. 45 are newly added in the second preferred embodiment.

Further, the subroutine corresponding to that shown in FIG. 22 of the first preferred embodiment is omitted since the contents thereof are identical to those of the first preferred embodiment.

Figure 35A:
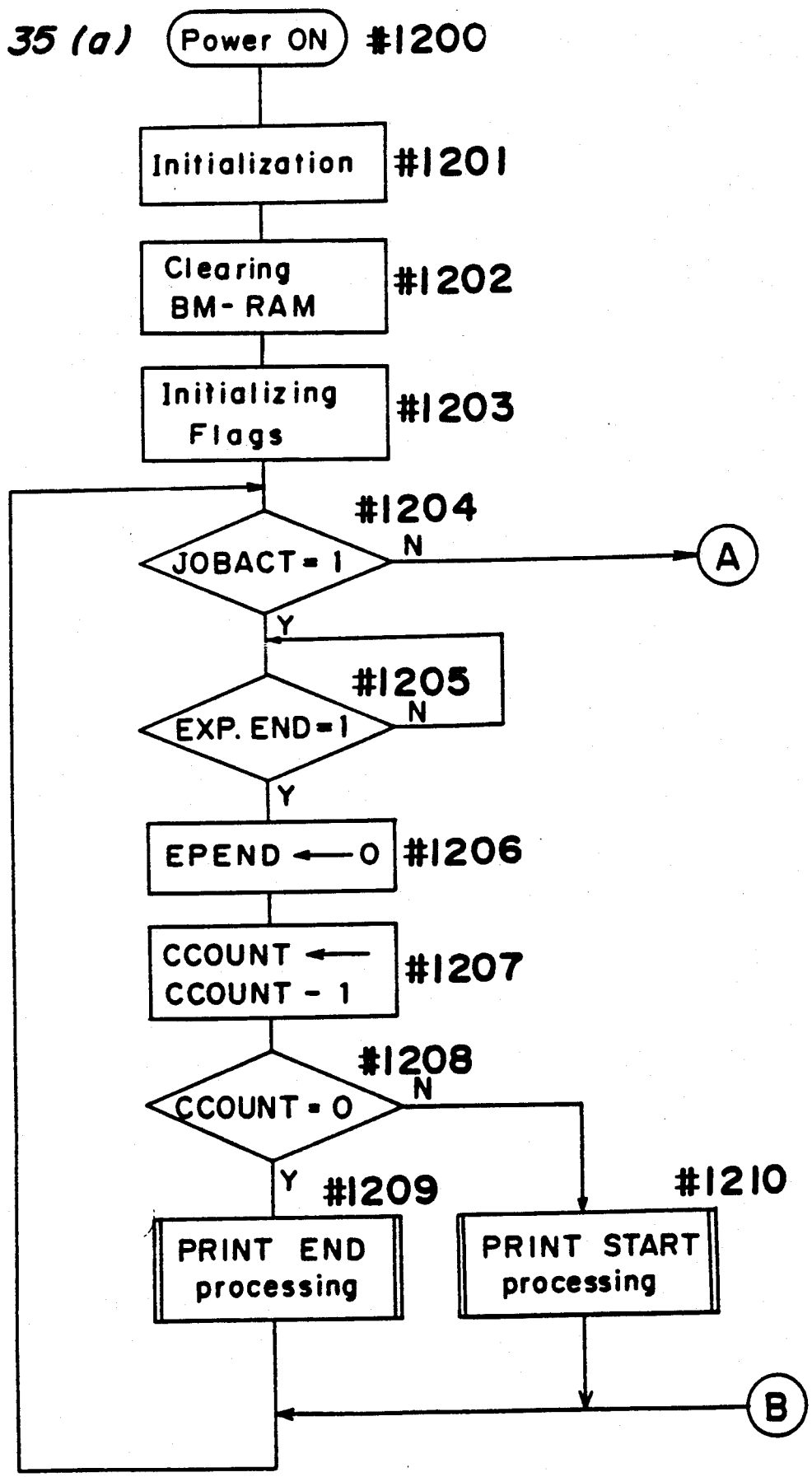
FIGS. 35 (a) and 35 (b) show a flow chart of the main routine to be executed by the second information processor in the second preferred embodiment of the present invention.
Figure 35:
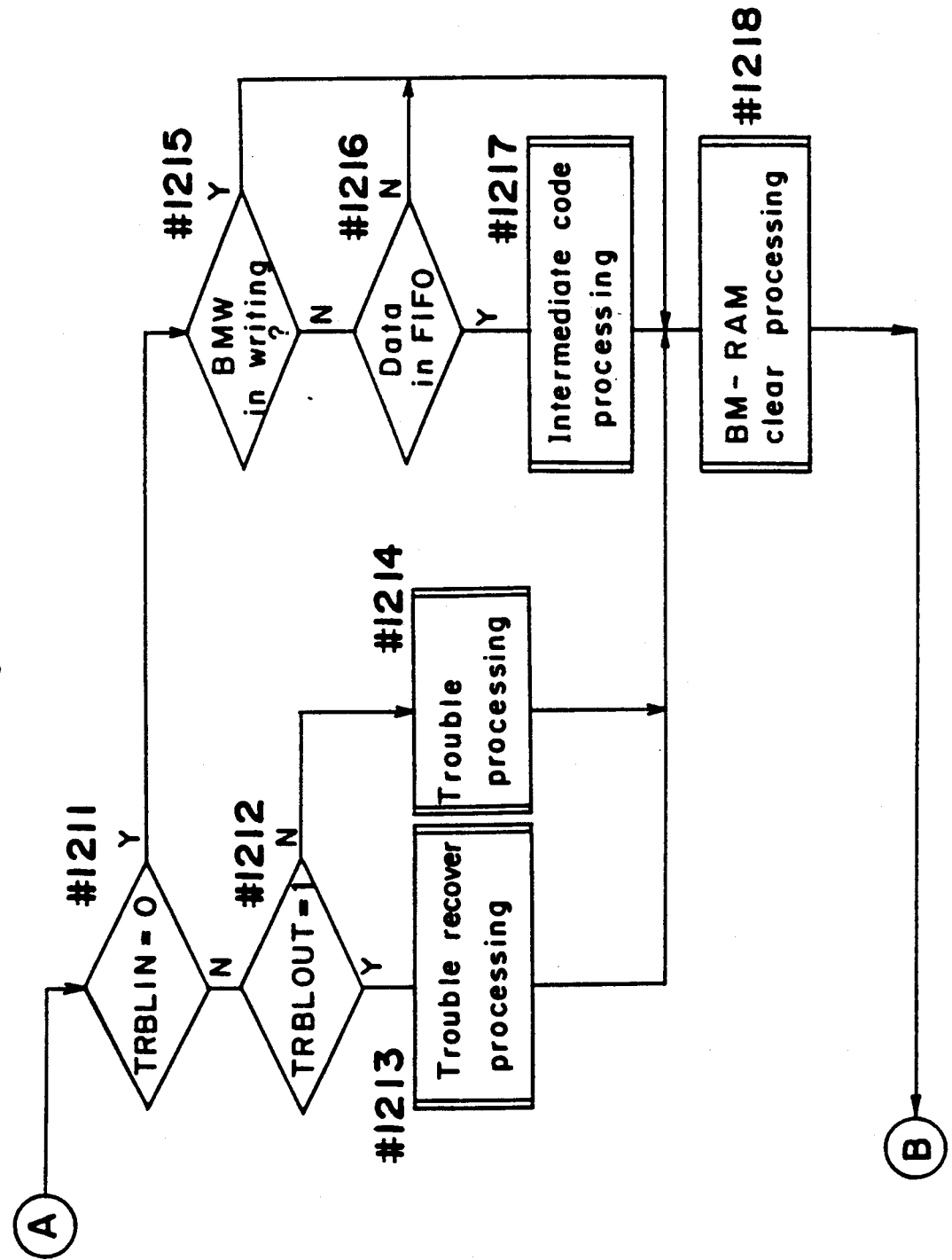

FIG. 35(a) and 35(b) shows the main routine to be executed by the second information processor 330.

When the power is switched on at step #1200, internal initialization, clearing of the image area of BM-RRAM 32 and initialization of flags are executed at steps #1201, #1202 and #1203, respectively. More concretely, JOBACT flag indicating the printing state and BMWRITE flag indicating the imaging state to BM-RAM 32 are cleared. COPY indicating the number of prints of the same page and CCOUNT for counting the same are set at one and CLEAR flag indicating that the physical clear request (CLREQ 1) has been input from the first information processor 320 is cleared. Also, PFCM flag for allowing to prefeed a print paper is set, BPFM flag indicating to clear data having been imaged in BM-RAM upon the cancelling processing is cleared, EPEND flag indicating an interruption having been executed by EXPEND command from the print engine 4 indicating the completion of an exposure is cleared, and, further, TRBLIN flag indicating an interruption by a trouble detection command from the print engine and TRBLOUT flag indicating a recovery form a trouble are cleared.

Thereafter, the process enters into the main loop. In the main loop, substantially three processings are executed as follows;

Analyzing intermediate codes and imaging dot images into BM-RAM (step #1217)
Print sequence control (steps #1205 to #1210)
Trouble processing (steps #1211 to #1214) and
BM-RAM clear processing (step #1218)

At first, if JQBACT flag as a flag for paper discharge condition has been set at step #1204, the process enters into the print sequence from step #1205 to step #1210.

In both of JOBACT flag and TRBLIN flag have not been set, INTERMEDIATE CODE processing is executed at step #1217 after checking the existence of data in FIFO 305.

[ INTERMEDIATE CODE processing & PRINT SEQUENCE control ]

Figure 40:
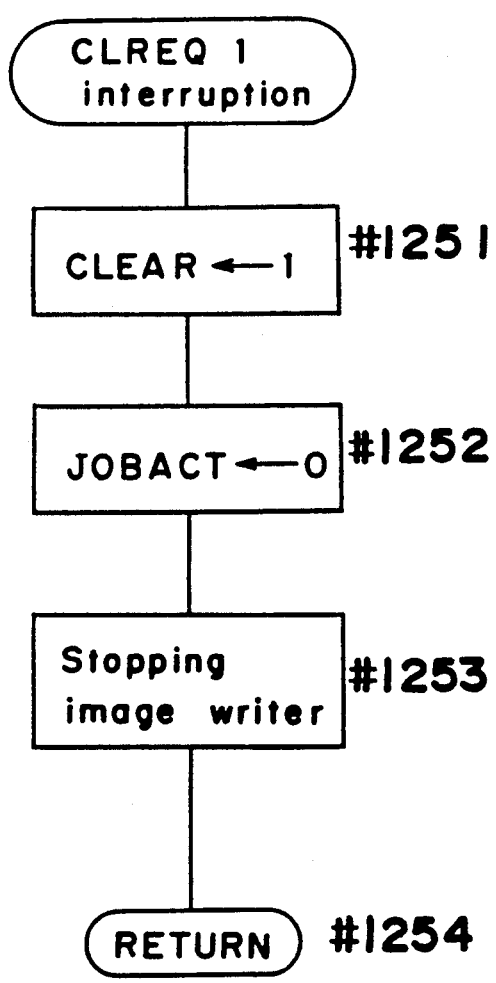
FIG. 40 is a flow chart of CLREQ 1 interruption according to the second preferred embodiment.

FIG. 40 shows a flow chart of CLREQ 1 interruption when CLREQ 1 signal is received through CLREQ 1 signal line from the first information processor 320.

When the interruption routine is started, CLEAR flag is set at one at step #1251 and JOBACT flag is reset in order to inhibit from entering into the print sequence at step #1252. Further the bit map writer is stopped at step #1253.

Figure 37:
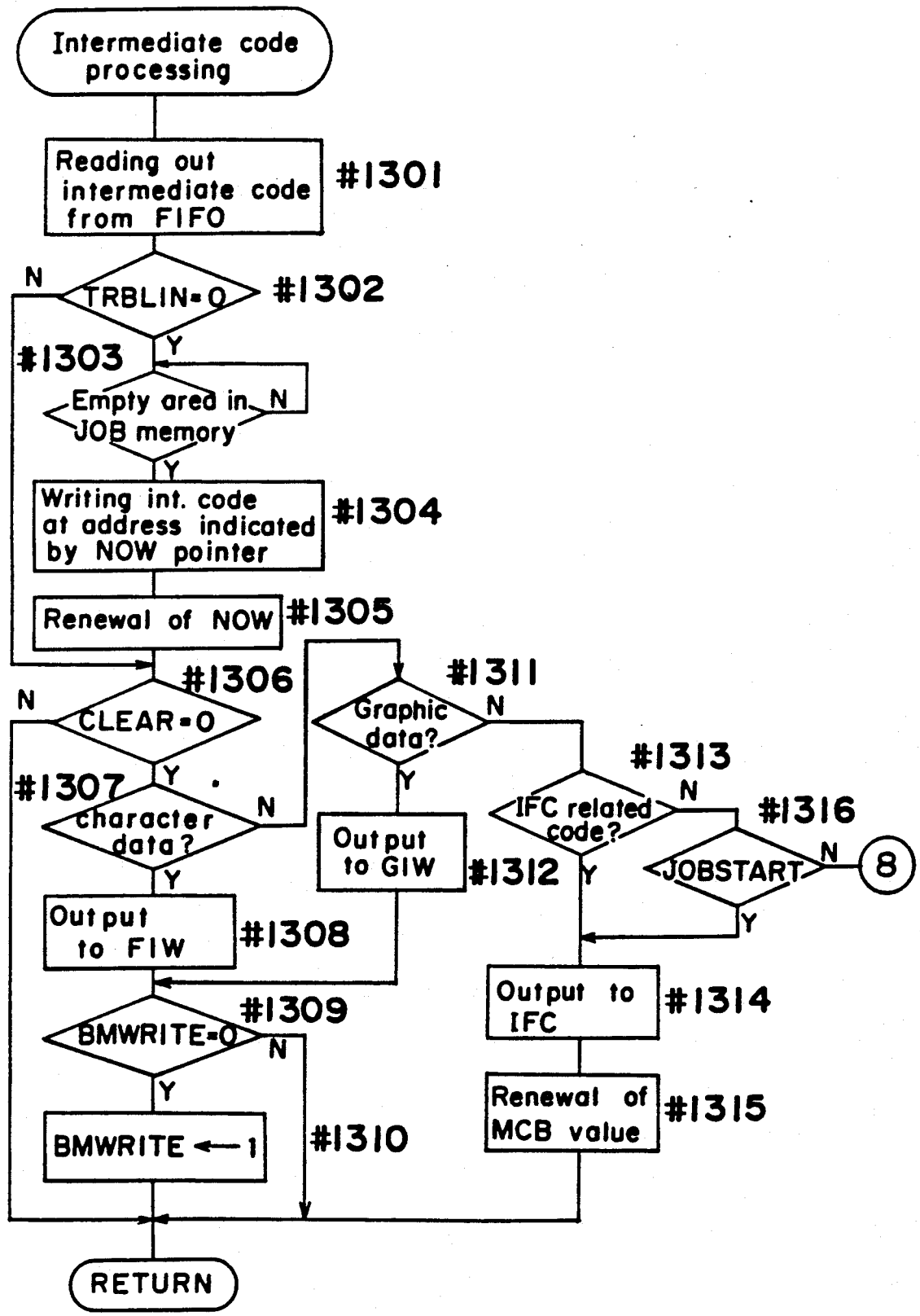
FIGS. 37 (a) and 37 (b) show a flow chart of INTERMEDIATE CODE processing according to the second preferred embodiment.
Figure 37:
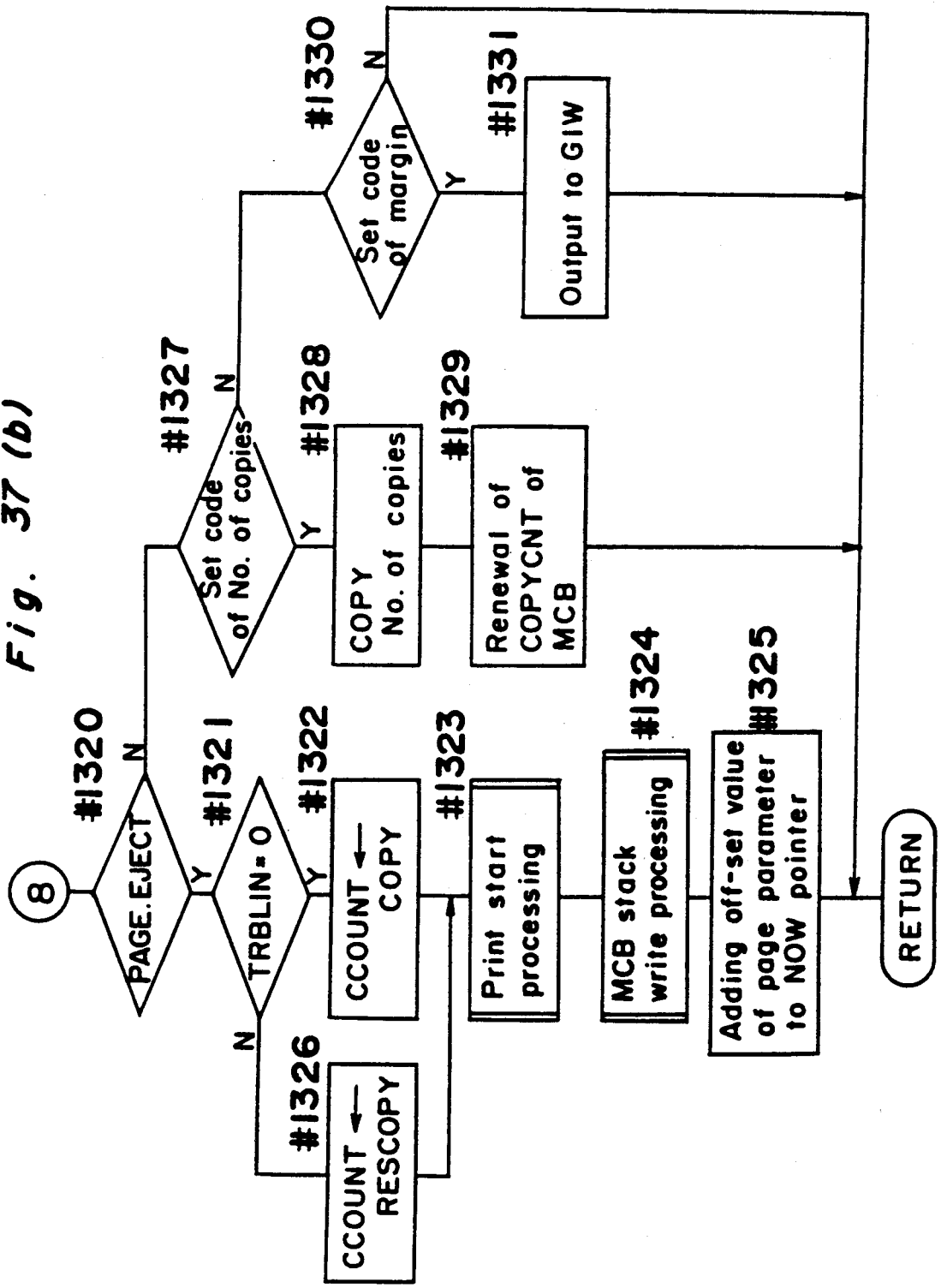

FIGS. 37(a) and 37(b) show a flow chart of INTERMEDIATE CODE processing for processing intermediate codes stored in FIFO 305. In this processing routine, sequence processings such as imaging into BM-RAM 32 in accordance with intermediate codes and commands outputted to the print engine 4 are executed.

At first, an intermediate code is read out from FIFO 305 at step #1301. If TRBLIN flag have not been set at step #1302, namely no trouble such as jamming is detected in the print engine, it is checked whether or not there is an empty area in JOB memory 310 at step #1303 and the intermediate code is written into the empty area of JOB memory 310 indicated by NOW pointer at step #1304. Then, NOW pointer is renewed at step #1305. If CLEAR flag has been set at step #1306, the process returns directly.

If the flag have not been set at step #1306 and if the intermediate code is a character code at step #1307, the latter is outputted to the font image writer (FIW) 311 at step #1308 and, if it is a graphic code at step #1311, it is outputted to the graphic image writer (GIW) 316 at step #1312.

If BMWRITE flag is zero at step.#1309, namely, data is initially written into, BMWRITE flag is set at one at step #1310.

If the intermediate code is an IFC related code (at step #1313) or JOBSTART code (at step #1316), it is outputted to IFC 40. Then, parameters of MCB are renewed at step #1315.

If the intermediate code is a MARGIN SET code at step #1330, it is outputted to GIW 316 in order to set the margin for imaging graphic images at step #1331.

Data output from FIFO 305 to BMW 31 is continued sequentially as far as data exists in FIFO.

When PAGE.EJECT code is detected at step #320 which indicates completion of transformation regarding all data of one page, the process enters into the processing for starting the printing operation.

Figure 39:
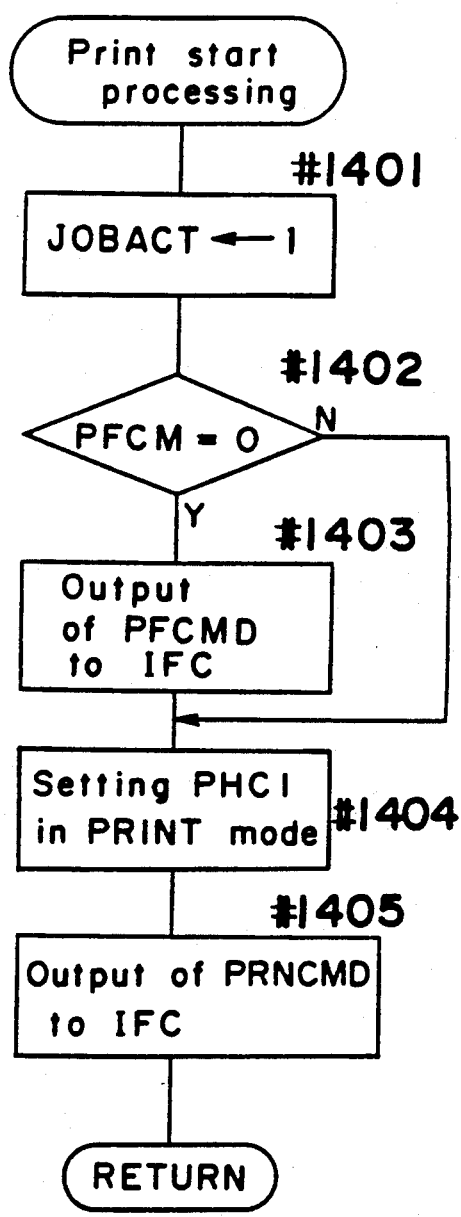
FIG. 39 is a flow char of PRINT START processing according to the second preferred embodiment.

At first, if TRBLIN flag has not been set at step #1321, the number of prints having been set beforehand in CCOUNT is set at step #1322 to enter into PRINT START processing at step #1323 (See FIG. 39). Further, in the case that TRBLIN flag has been set at step #1321, RESCOPY indicating the number of papers not having been discharged is set to CCOUNT in order to print remaining pages.

In PRINT START processing, as shown in FIG. 39, JOBACT flag is set at one in order to inhibit BM-RAM 32 from renewal thereof at step #1401.

Next, if PFCM flag for setting a pre-feed mode has not been set at step #1402, PRNCMD is outputted to IFC 40 at step #1403. Then, PHC interface 315 is set into the printable state at step #1404 and PRNCMD ( print command ) is outputted to IFC 40 at step #1405. Due to this, PHC interface 315 outputs data into BM-RAM 32 through the bus B4 in synchronization with pulses sent from the control circuit of PHC 42.

Figure 41:
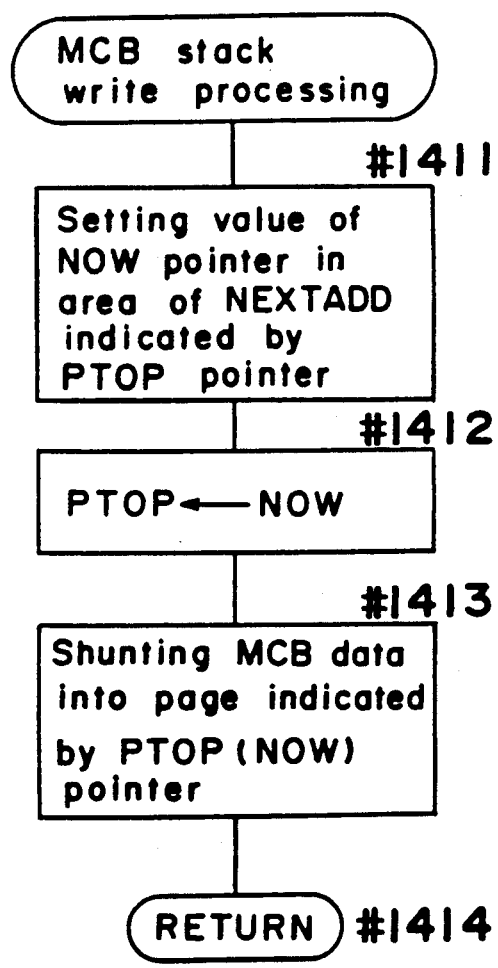
FIG. 41 is flow chart of MCB STACK WRITE processing according to the second preferred embodiment.

Referring to FIG. 37(b) again, when PRINT START processing has been completed, MCB STACK WRITE processing is executed at step #1324 (See FIG. 41).

In MCB STACK WRITE processing, MCB data not having been edited in unit of page are stored into JOB area for the next page. Referring to FIG. 41, a value of NOW printer is set at NEXTADD in MCB stack area of the current page in exposing at the present time in order to memorize the top address of the next page at step #1411. Then, a value of NOW pointer is set to PTOP pointer at step #1412 and MCB data are shunt into the page area indicated by PTOP pointer at step #1413.

When MCB STACK WRITE processing has been completed, the process advances to step #1325 in order to set the value of NOW pointer at the next area of the page parameter area.

When the print operation has been completed, the process advances from step #1204 to step #1205 in order to wait for EXPEND interruption since JOBACT flag has been set.

When EXPEND command is detected, EPEND flag is set at one and copy control for the identical image is executed by slipping out of the processing loop (steps #1205 to #1210). Namely, CCOUNT for counting a number of prints is decremented at step #1207 and it is checked whether the copying operation for the predetermined number of prints has been completed or not at step #1208. If it has been completed, the process enters into PRINT END processing at step #1209 (See FIG. 36).

In PRINT END processing, BM-RAM 32 is cleared to image the next page data at step #1241 and JOBACT flag is reset to release the print state at step #1242. Further, BMWRITE flag indicating the imaging state to BM-RAM is cleared and CCOUNT is resumed at step #1243. If the copying operation has not been performed, it is restarted to obtain remaining prints of the identical image at step #1210.

[ BM-RAM CLEAR processing ]

This clear processing is forcibly executed even when a character image or a graphic image is in imaging thereto.

Figure 38:
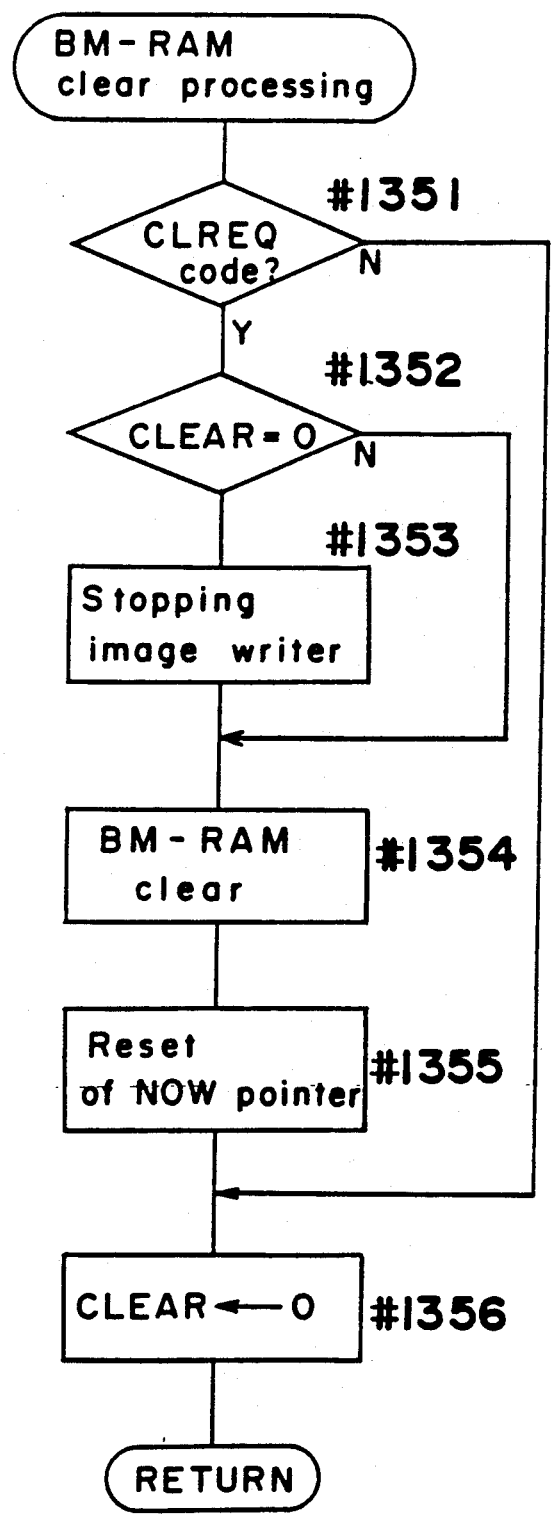
FIG. 38 is a flow chart of BM-RAM CLEAR processing according to the second preferred embodiment.

Referring to FIG. 38, if the intermediate code read from FIFO is not CLREQ code at step #1351, the process returns without doing anything. If it is CLREQ code, the image writer is stopped at step #1353 only in the case that CLEAR flag have not been set. After clearing BM-RAM 32 at step #1354, NOW pointer is reset at step #1355 in order to clear data in JOB memory 310. Thereafter, CLEAR flag is rest at step #1356. Then, the process advances to execute PRINT END processing similarly in the case of PAGE.EJECT processing.

If CLEAR flag has been set by ALL PAGE CLEAR request (CLREQ 1) from the first information processor 320, data in FIFO 305 are omitted from reading in INTERMEDIATE CODE processing. This processing is continued at step #1351 until CLREQ code is detected, intermediate codes from the occurrence of CLREQ 1 interruption to the detection of CLEAR REQUEST command are erased.

[ TROUBLE RECOVERY processing ]

Figure 44:
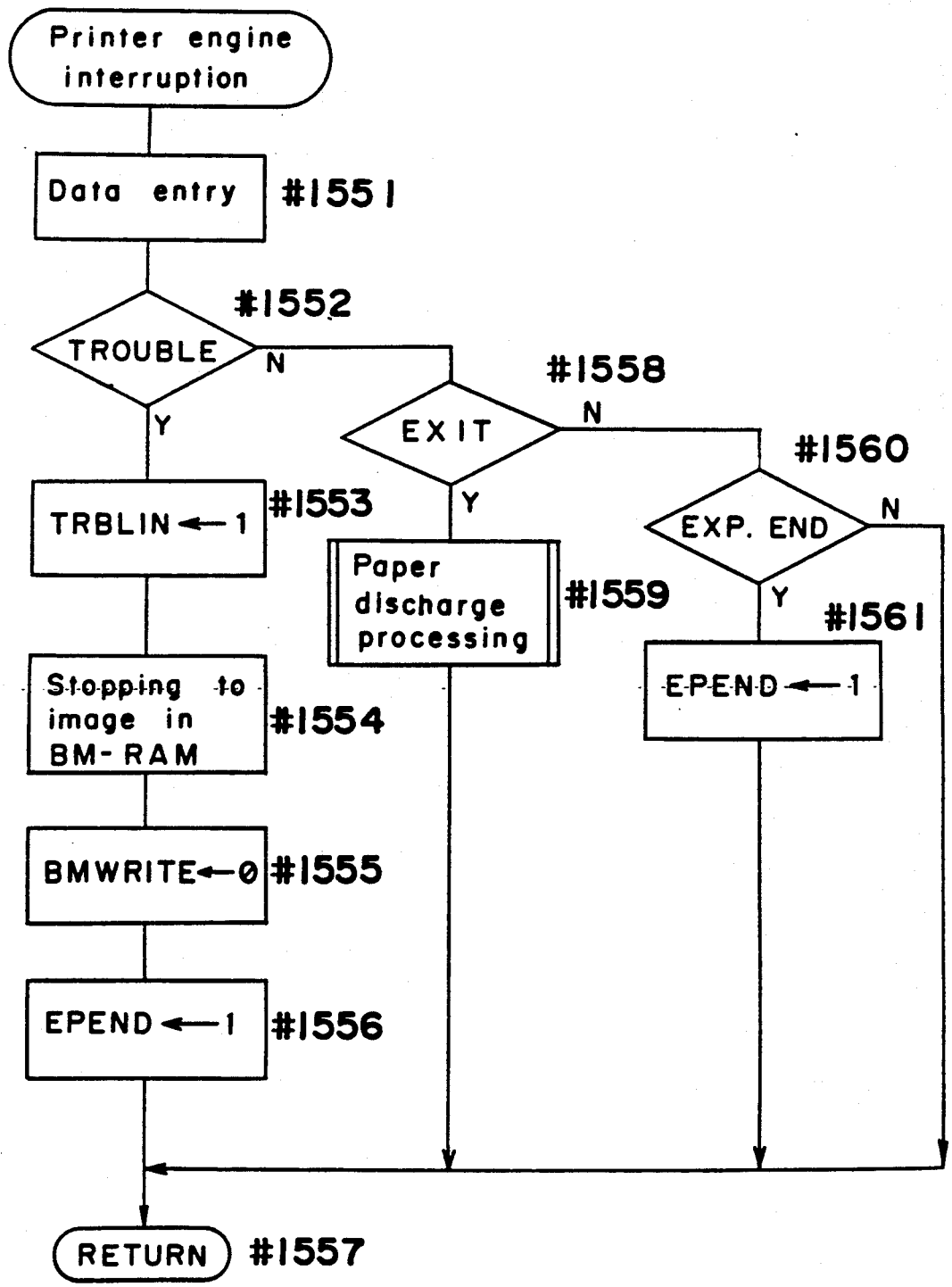
FIG. 44 is a flow chart of an interruption by the print engine according to the second preferred embodiment.

As shown in FIG. 44, TROUBLE command is detected at step #1552, the process enters into an interruption routine. In this routine, TRBLIN indicating an occurrence of a trouble is set at step #1553, the imaging to BM-RAM 32 is stopped at step #1554, BM-RAM 32 is cleared at step #1555 and further, EPEND flag is set forcibly at step #1556.

In the main routine, if TRBLIN flag has been set at step #1211, the process enters into TROUBLE processing from steps #1212 to #1214. Namely, if TRBOUT flag is not still set at step #1212, the process advances to step #1214 in order to execute TROUBLE processing (See FIG. 42).

Figure 42:
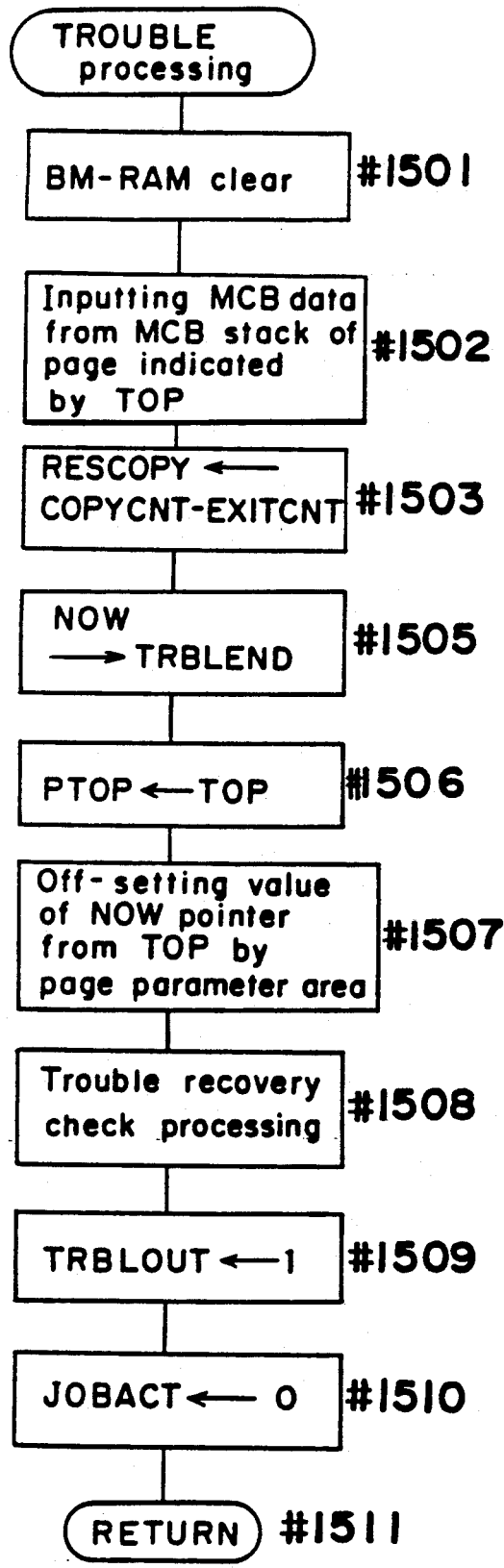
FIG. 42 is a flow chart of TROUBLE processing according to the second preferred embodiment.
Figure 45:
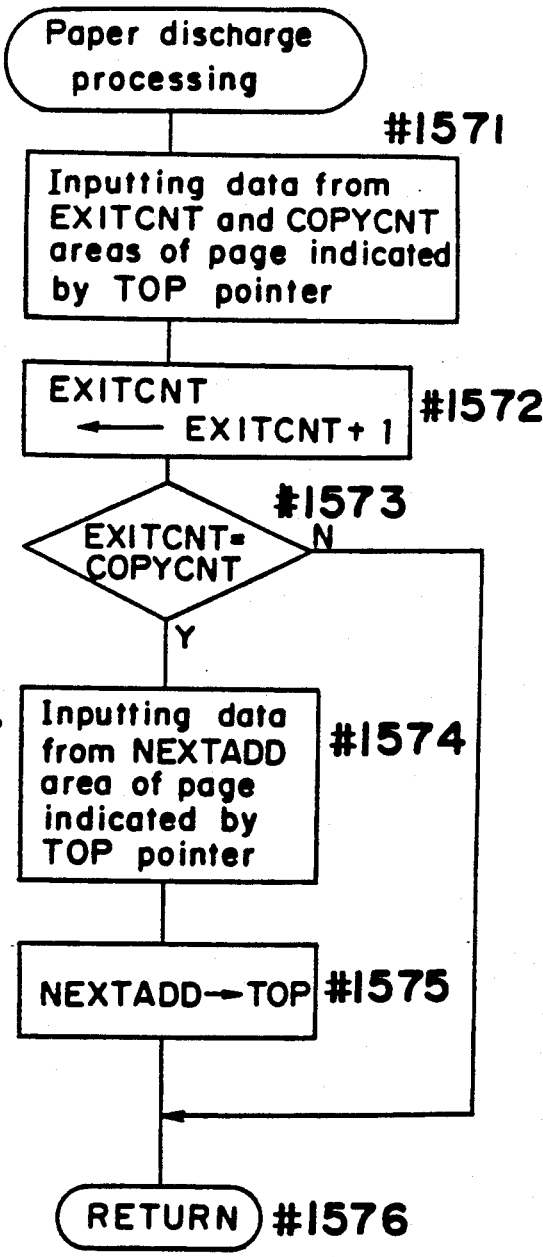
FIG. 45 is a flow chart of PAPER DISCHARGE processing according to the second preferred embodiment.

Referring to FIG. 42, in TROUBLE processing, BM-RAM 32 is cleared at step #1501. Data are input from MCB memory 310 thereinto at step #1502. Next, the number of remaining prints in the multi-copy is calculated and the calculated number is set into RESCOPY at step #1503. EXITCNT counter used for calculating RESCOPY counts the number of prints having been discharged completely corresponding to respective JOBs. The counting method is shown in FIG. 45.

PAPER DISCHARGE operation is actually performed by an interruption due to EXIT command ( PAPER DISCHARGE command ) from the print engine 4.

In this routine, COPYCNT and EXITCNT are picked up from MCB stack of the current page now processed to discharge it at step #1571 and EXITCNT is incremented by one at step #1572 in order to set back to MCB stack. Thereafter, it is compared with COPYCNT at step #1573 and, if it is equal to the latter, TOP pointer is renewed to the next page at step #1574 since the paper discharge operation is considered to have been completed. If it is not equal to, the process returns directly since the multi-print operation is still continued.

Thus, if a trouble is occurred during the multi-print operation, the difference between COPYCNT and EXITCNT indicates a remaining number of prints to be printed further.

Returning to FIG. 42, the present value of NOW pointer is shunted to TRBLEND at step #1505 in order to detect the completion of TROUBLE processing and NOW pointer is set at the top of an area of MCB memory corresponding to the page to be reprinted at step #1507.

Thereafter, when it is detected that the print engine 4 is recovered from the trouble at step #1508 (See FIG. 43), TRBLOUT flag is set at step #1510 in order to enter TROUBLE RECOVERY processing and then, JOBACT flag is cleared at step #1511.

Figure 43:
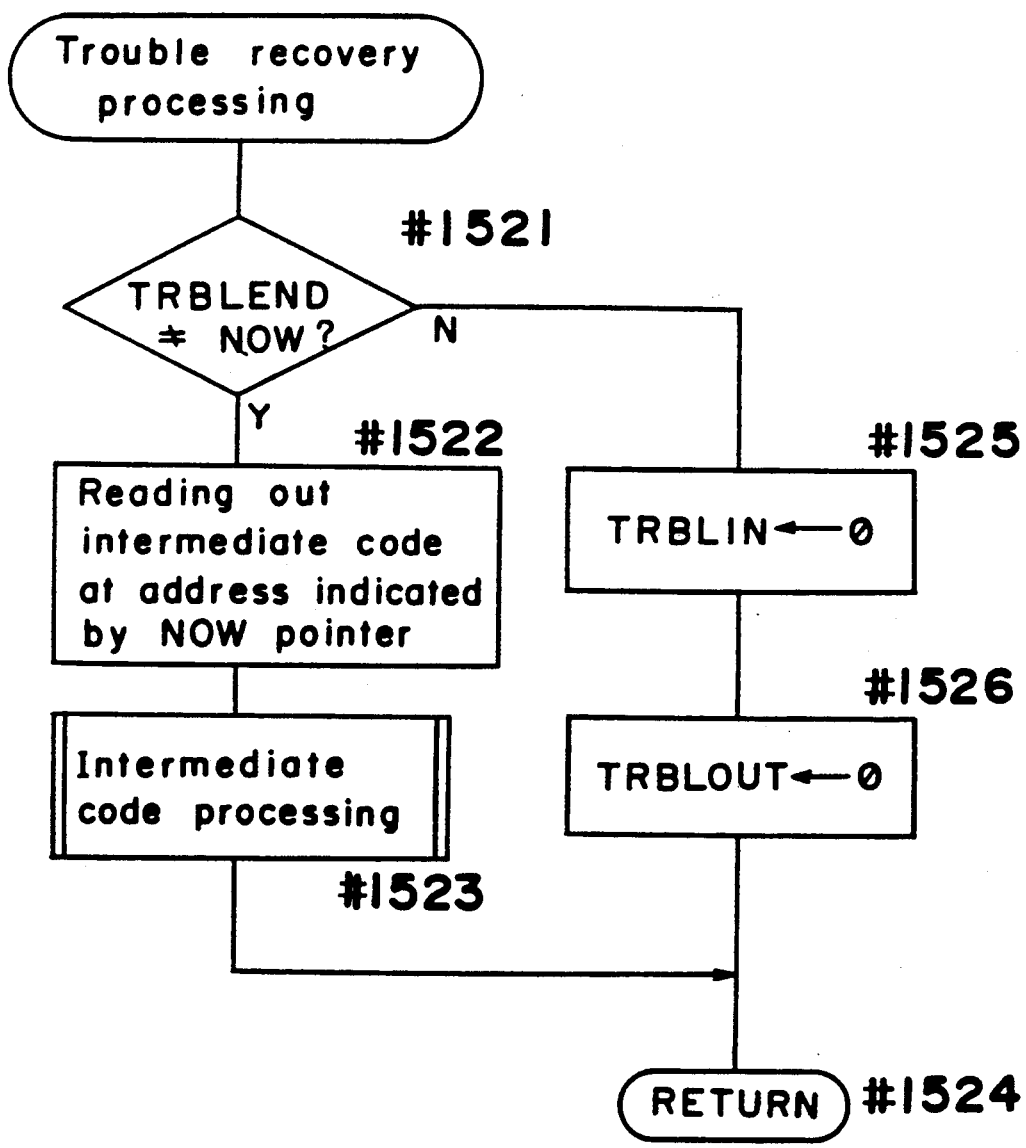
FIG. 43 is a flow chart of TROUBLE RECOVERY processing according to the second preferred embodiment.

Referring to FIG. 43, intermediate codes are picked up from JOB memory 310 at step #1522 until NOW pointer indicates TRBLEND at step #1521 and intermediate codes picked up are processed in INTERMEDIATE CODE processing at step #1523.

When all of intermediate codes in JOB memory namely TRBLEND coincides with NOW pointer at step #1521, TRBLIN and TRBLOUT flags are reset at zero at steps #1525 and #1526, respectively to return to the usual operation.

Since the processing routines to be executed by IFC 40 are same as those of the first preferred embodiment, shown in FIGS. 25, 26 and 27, they are omitted.

The preferred embodiments described herein are illustrative and not restrictive, the scope of the invention being indicated by the appended claims and all variations which come within the meanings of the claims are intended to be embraced herein.

What is claimed is:

1. A printer comprising:
   interface means for receiving code data indicating printing information and control information sent from an external apparatus;
   processing means for processing received code data to generate resultant data;
   first memory means for storing said resultant data;
   output means for outputting print data to a printing section of the printer in accordance with said resultant data stored in said first memory means;
   signal generation means for generating a signal indicating when said printing section enters a predetermined state during operation of said printing section;
   second memory means for storing format information regarding at least one page including the page being printed;
   control means for stopping operation of said printing section when said signal is generated by said signal generation means and restarting said printing operation of the printing section in accordance with the format information stored in said second memory means when said predetermined state is terminated.

2. A printer as claimed in claim 1, in which said predetermined state is an abnormal state.

3. A printer as claimed in claim 1, in which said second memory means stores the format information in the form of code data received by said interface means.

4. A printer as claimed in claim 1, in which said second memory means stores said resultant data obtained by said processing means.

5. A printer comprising:
   interface means for receiving code data indicating printing information and control information sent from an external apparatus;
   first memory means for storing received code data;
   processing means for processing said code data stored in said first memory means to generate resultant data;
   second memory means for storing said resultant data;
   output means for outputting printing data to a printing section of the printer in accordance with said resultant data stored in said second memory means;
   signal generation means for generating a signal indicating when said printing section enters a predetermined state during operation of said printing section;
   third memory means for storing format information regarding at least the page being printed, said third memory means being connected to said processing means; and
   control means for stopping printing operation of said printing section when said signal is generated by said signal generation means and restarting said printing operation of the printing section in accordance with the format information stored in said third memory means when said predetermined state is terminated.

6. A printer as claimed in claim 5, in which said control means clears the contents of said second memory means causing said processing means to operate in accordance with said format information stored in said third memory means.

7. A printer as claimed in claim 5, in which said predetermined state is an abnormal state of said printing section.

8. A printer comprising:
   interface means for receiving code data indicating printing information and control information sent from an external apparatus;
   first memory means for storing received code data;
   processing means for processing said code data stored in said first memory means to generate resultant data;
   second memory means for storing said resultant data;
   output means for outputting printing data to a printing section of the printer in accordance with said resultant data stored in said second memory means;
   signal generation means for generating a signal indicating when said printing section enters a predetermined state during operation of said printing section;
   third memory means for storing format information regarding at least a page being printed, said third memory means storing format information processed by said processing means; and
   control means for stopping the printing operation of said printing section when said signal is generated and restarting said printing operation of said printing section in accordance with the format information stored in said third memory means when said predetermined state is terminated.

9. A printer as claimed in claim 8, in which said control means causes said output means to output said resultant data stored in said second memory means in accordance with the format information stored in said third memory means when said predetermined state is dissolved.

10. A printer as claimed in claim 8, in which said predetermined state is an abnormal state of said printing section.

* * * * *